United States Patent [19]
Bowman

[11] Patent Number: 5,681,459
[45] Date of Patent: *Oct. 28, 1997

[54] REFECT WATER DRAIN LINE INSTALLATION SYSTEM AND APPARATUS FOR UNDER SINK REVERSE OSMOSIS FILTER SYSTEM

[76] Inventor: Dennis E. Bowman, 2637 Whitewood Ave., Ann Arbor, Mich. 48104

[ * ] Notice: The term of this patent shall not extend beyond the expiration date of Pat. No. 5,449,456.

[21] Appl. No.: 514,871

[22] Filed: Aug. 14, 1995

Related U.S. Application Data

[63] Continuation-in-part of Ser. No. 206,850, Mar. 7, 1994.

[51] Int. Cl.$^6$ .................................................. B01D 27/08
[52] U.S. Cl. .......................... 210/232; 210/418; 210/460; 285/156; 285/180; 137/216
[58] Field of Search .......................... 285/150, 156, 285/180; 210/153, 172, 248, 251, 321.6, 460, 500.21, 232, 418; 138/37, 89, 109, 120, 155, 177; 4/629, 679, 680, DIG. 7; 137/216, 216.1

[56] References Cited

U.S. PATENT DOCUMENTS

| | | | |
|---|---|---|---|
| 2,122,051 | 6/1938 | Baird. | |
| 2,302,617 | 11/1942 | Little. | |
| 2,644,543 | 7/1953 | Russell | 285/150 |
| 2,834,615 | 5/1958 | Bleakley | 285/150 |
| 3,346,887 | 10/1967 | Sommer. | |
| 3,620,241 | 11/1971 | Brown. | |

(List continued on next page.)

OTHER PUBLICATIONS

Water Factory Systems–Series N4000,N4500, N5000(98–880019 Rev.A).
Dearborn Brass –Effective Jul. 1, 1992(Cover/Back and pp. 7,8,10,11,1.
Brass Craft –(pp. E–1, E–2, E–3, E–4, E–5).

*Primary Examiner*—W. L. Walker
*Attorney, Agent, or Firm*—Barnes, Kisselle, Raisch, Choate, Whittemore & Hulbert, P.C.

[57] ABSTRACT

Reject waste water adapter coupling fitting, system and installation method for use with a household undercounter reverse osmosis (R/O) water filtration installation associated with an in-counter sink having a garbage disposer with its outlet connected by standard slip fit plumbing fittings to a sink drain trap plumbed to the household sewer system. The R/O reject waste water undercounter drain line is coupled into the sink drain trap in parallel drainage relation with the disposer outlet plumbing fittings by a baffle Tee plumbing fitting having first and second inlets perpendicular to one another with their input drainage liquid flow separated by an internal baffle. The garbage disposer outlet is coupled by a standard slip fit single inlet/outlet conduit plumbing fitting to the baffle Tee first inlet. The baffle tee has a single outlet slip coupled to the inlet of the trap. An R/O drain elbow adapter coupling has its inlet connected to the waste water drain line and its outlet coupled via plumbing fitting coupling structure to the Tee second inlet, and end closure structure is operably associated with the elbow coupling and sealably closes a normally open inlet of the drain fitting coupling structure. In one embodiment the end closure structure is directly attached to the baffle Tee second inlet and has a circular disc with a through-opening threadably receiving the elbow outlet, a standard washer seated on the baffle Tee second inlet, the disc being seated on the washer, and a slip joint nut threadably received on the baffle Tee second inlet and clamping the disc and washer sealably thereagainst. For an installation with a second non-disposer in-counter sink mounted adjacent the disposer sink, a series of S/J standard plumbing fittings connect the second sink drain outlet to the baffle Tee second inlet. A three-way Tee has its coaxial inlet and outlet ends serially slip coupled into the fittings and the end closure structure and associated elbow outlet are attached to a side T-inlet of the three-way Tee. Improved installation methods, various improved waste water drainage systems and various improved adapter coupling embodiments are also disclosed for commercial as well as household undercounter use.

12 Claims, 8 Drawing Sheets

U.S. PATENT DOCUMENTS

| | | |
|---|---|---|
| 4,145,768 | 3/1979 | Chevrette . |
| 4,221,406 | 9/1980 | Traylor . |
| 4,250,920 | 2/1981 | Traylor . |
| 4,454,891 | 6/1984 | Dreibelbis et al. . |
| 4,721,331 | 1/1988 | Lemelshtrich .......................... 285/150 |
| 4,771,485 | 9/1988 | Traylor . |
| 4,856,121 | 8/1989 | Traylor . |
| 4,882,061 | 11/1989 | Petrucci et al. . |
| 4,998,754 | 3/1991 | Matsumoto et al. . |
| 5,039,134 | 8/1991 | Meadows et al. ..................... 285/150 |
| 5,104,150 | 4/1992 | Bard et al. . |
| 5,119,860 | 6/1992 | Slovak et al. . |
| 5,132,017 | 7/1992 | Birdsong et al. . |
| 5,143,601 | 9/1992 | Slovak et al. . |
| 5,152,321 | 10/1992 | Drager et al. . |
| 5,176,165 | 1/1993 | Traylor . |

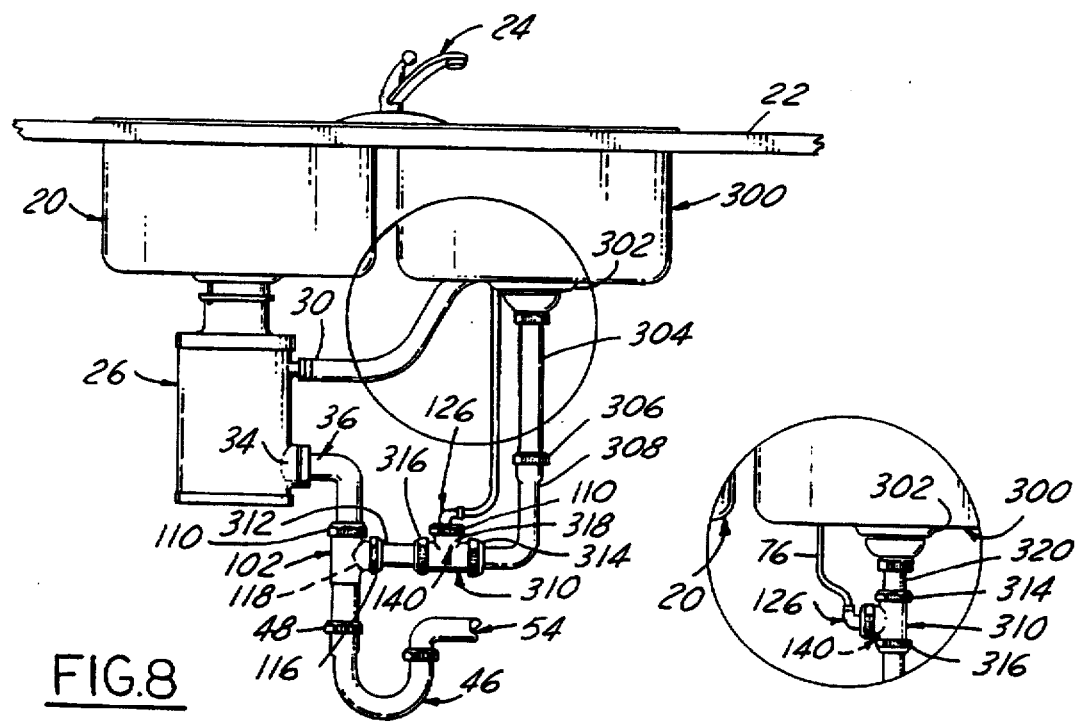
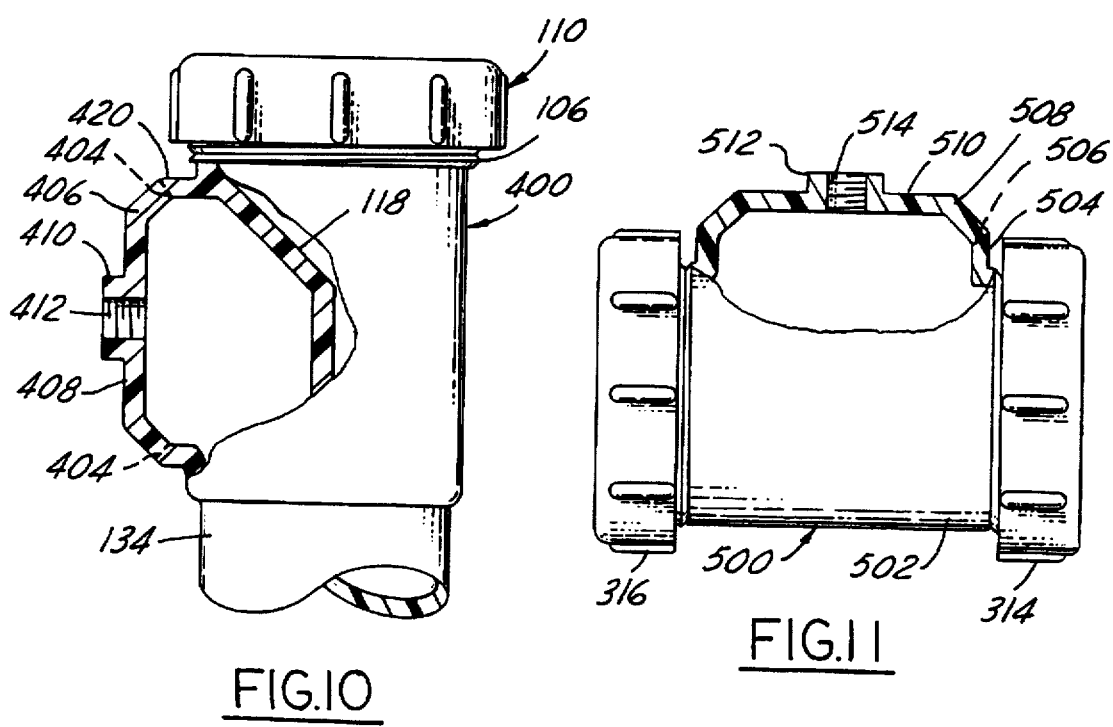

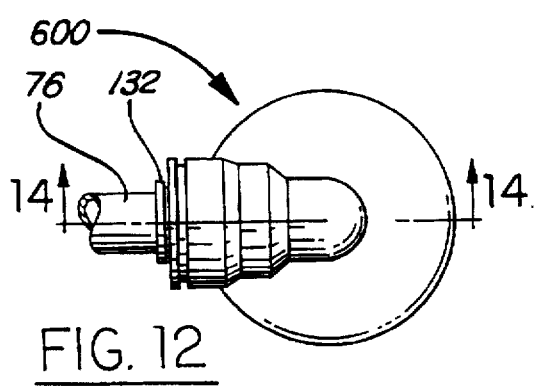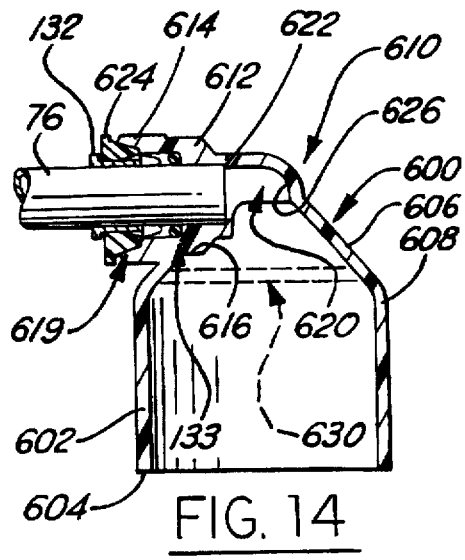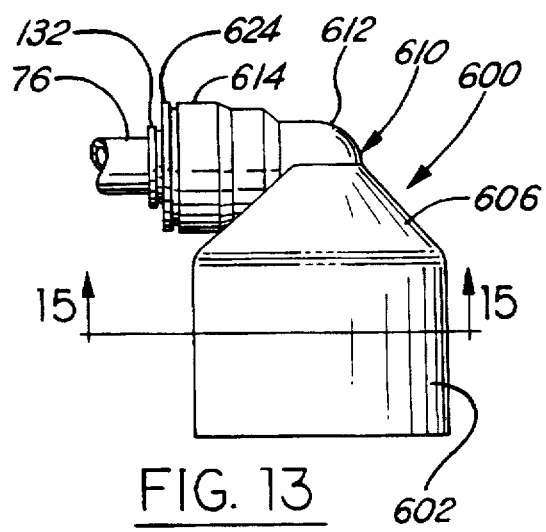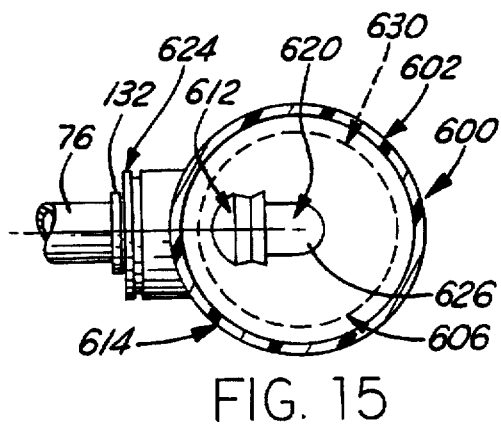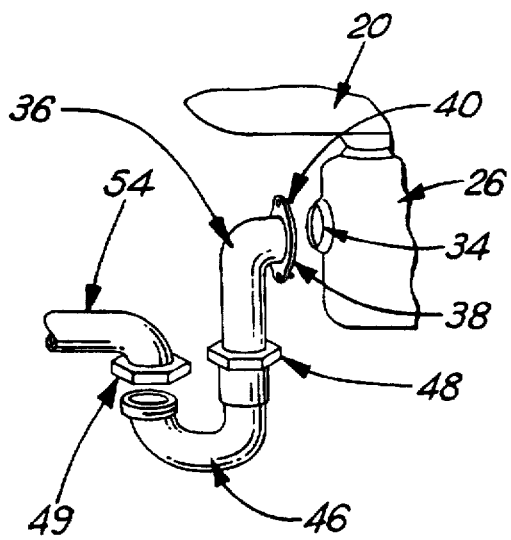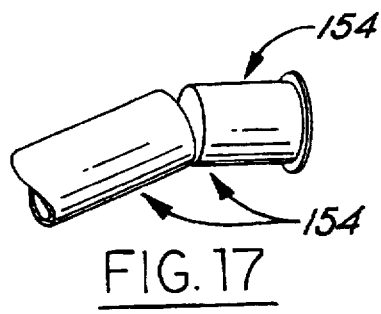

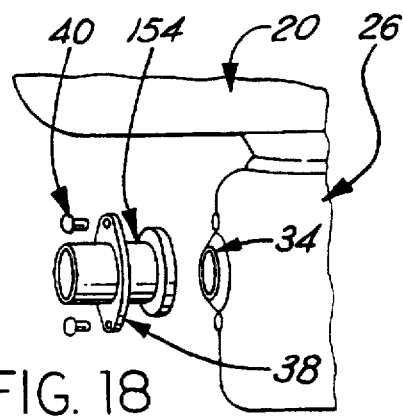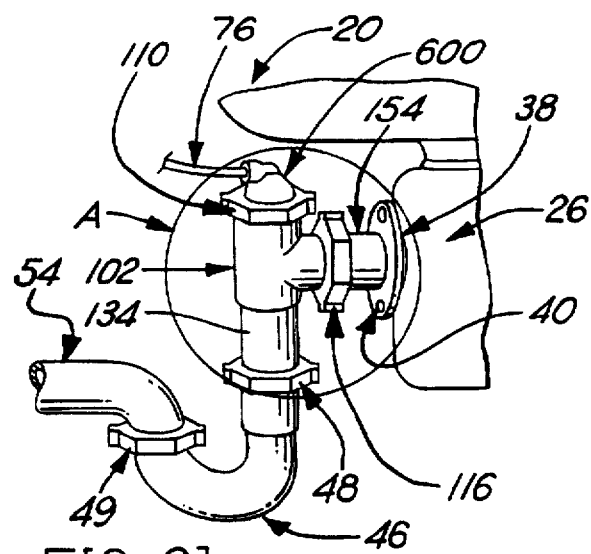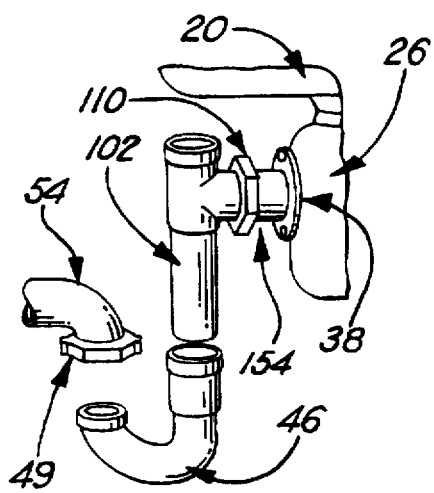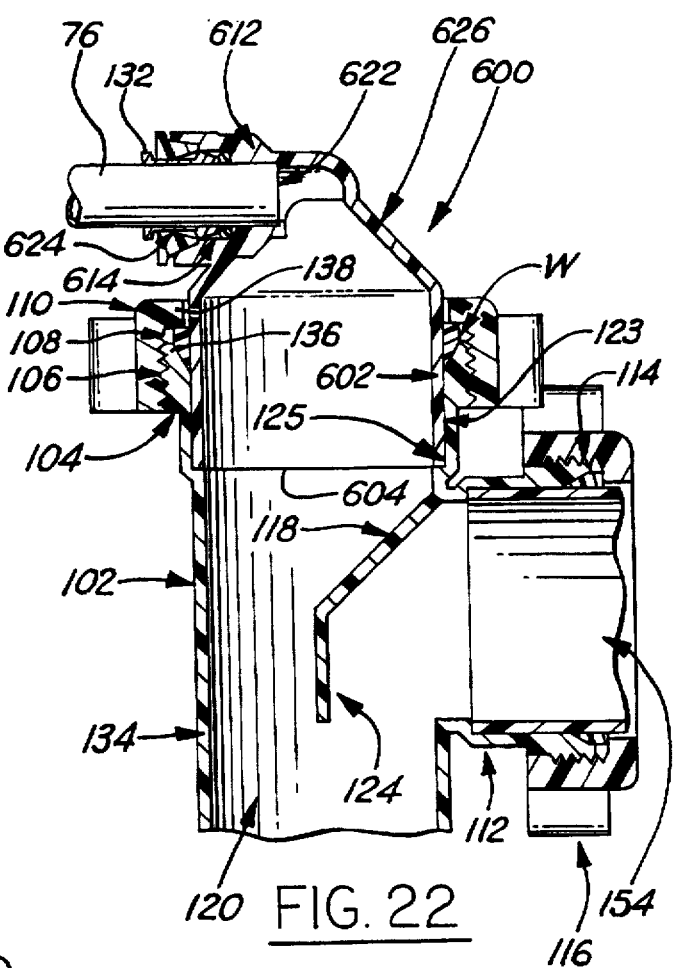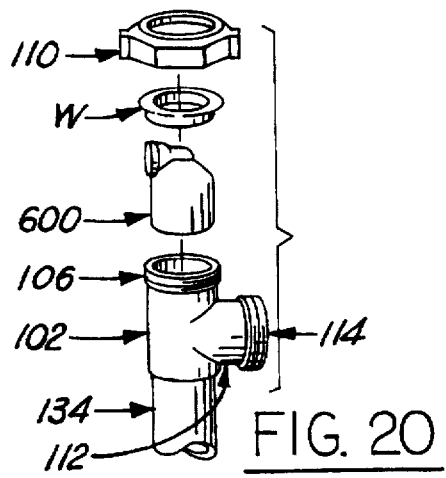

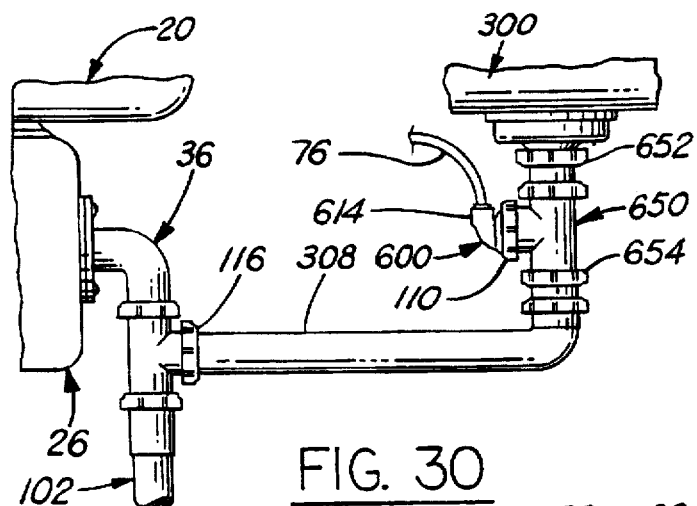
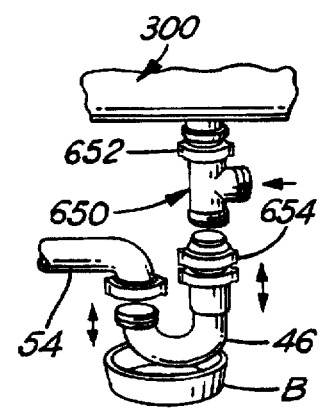
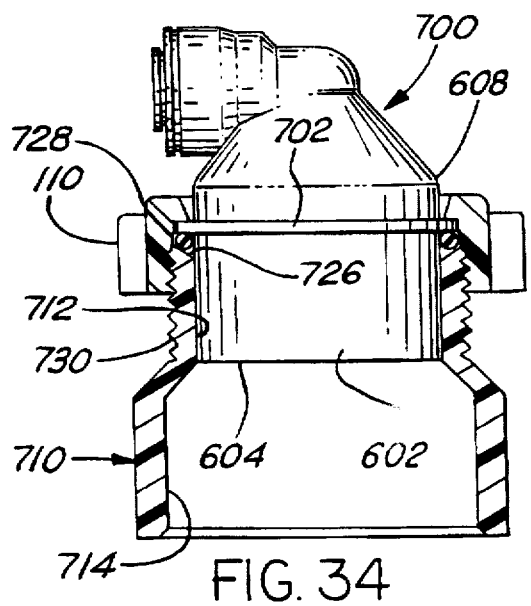
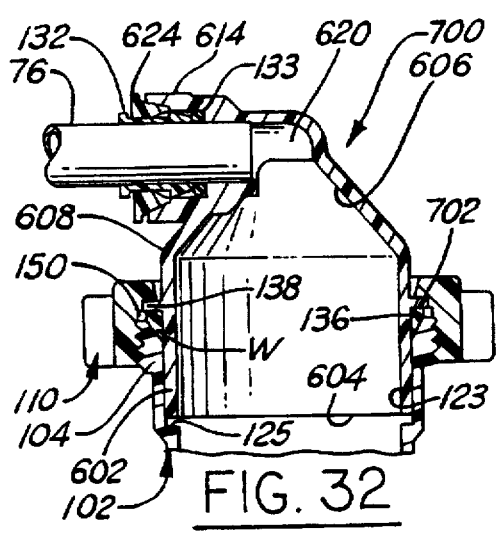
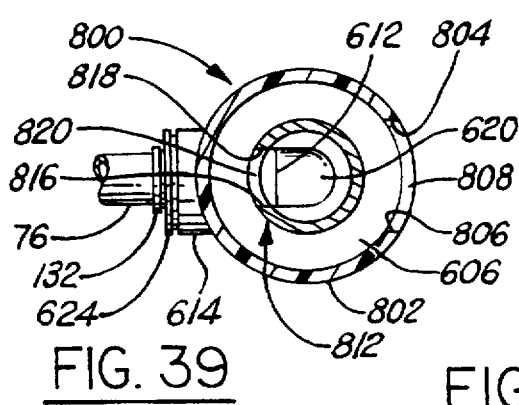
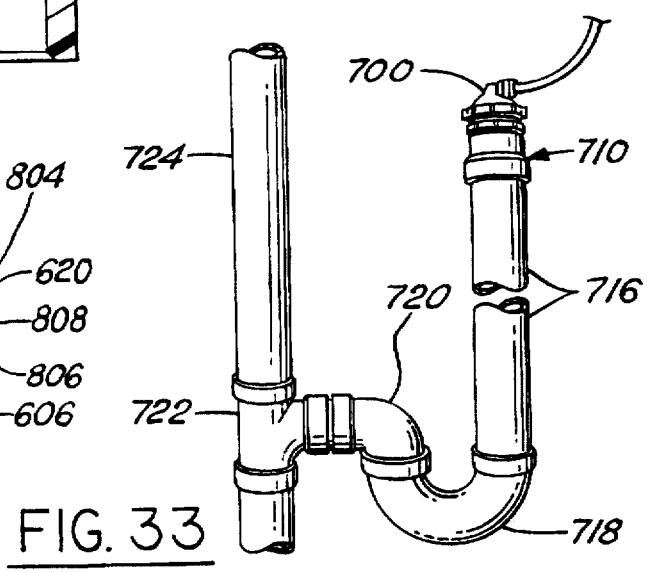

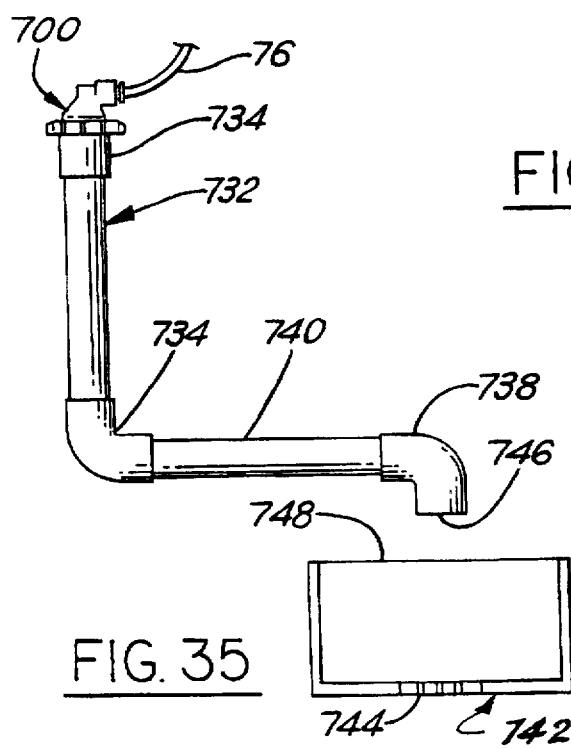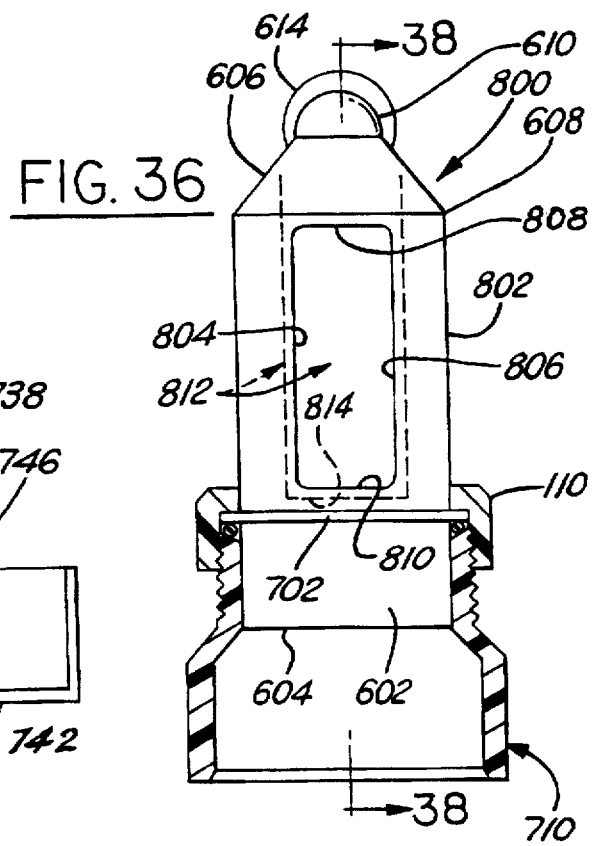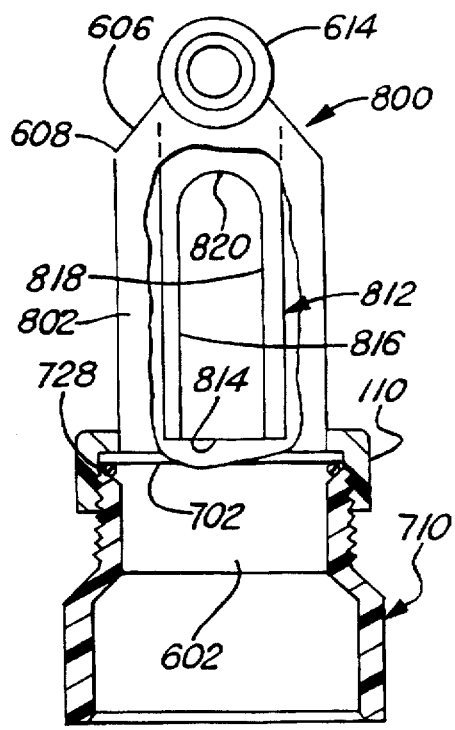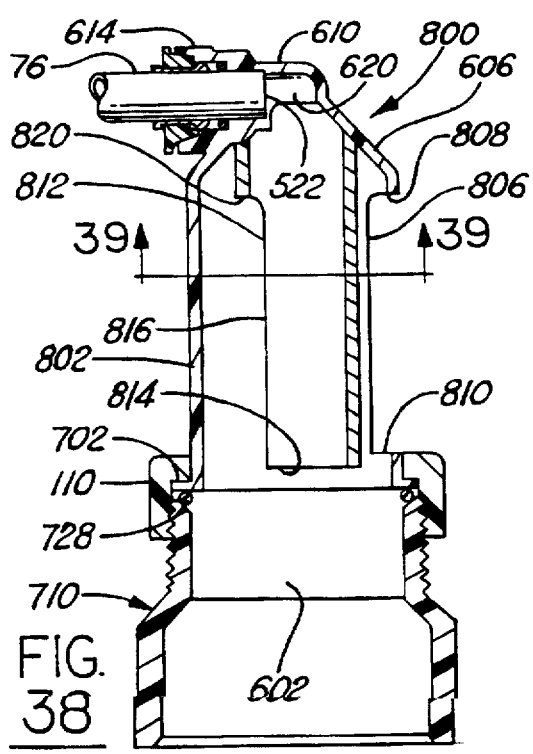

REJECT WATER DRAIN LINE INSTALLATION SYSTEM AND APPARATUS FOR UNDER SINK REVERSE OSMOSIS FILTER SYSTEM

REFERENCE TO CO-PENDING APPLICATIONS

This application is a continuation-in-part of my co-pending application Ser. No. 08/206,850 filed Mar. 7, 1994.

FIELD OF THE INVENTION

The present invention relates generally to dispensing systems for potable water, and more particularly to improvements in drain line installation systems and apparatus for disposing of reject water from an under sink reverse osmosis water filter system into an existing household plumbing system.

BACKGROUND OF THE INVENTION

Reverse osmosis systems (referred to alternatively herein as "R/O" Systems) applied to the purification of water are known in the art. Their use is expanding rapidly for the production of relatively small quantities of potable water for household uses.

Such reverse osmosis systems under normal operating conditions produce a continuous flow of waste water, which may amount to as much as 75% of the input water volume, and which may have a high salt content. This waste water or brine must have a continuous drainage facility for removing this processed water from the reverse osmosis system. In this respect, for the safety of the system and to meet laws and ordinances of towns and municipalities, particularly where such drainage facilities are connected to the sewer system, an adequate anti-syphon means is required to prevent the possibility of sewage or tainted water backing into the R/O System through the drain for the waste water or brine. Generally this is in the form of a one inch or more air gap in the drain line at a point or at a specified height above the valve mounting surface or waste water basin overflow plane for undercounter installation set-ups.

Typically, most kitchen counter single compartment sinks have their sole bottom outlet plumbed directly to the main waste inlet of a conventional garbage disposer unit. Waste water from the sink flows through the garbage disposer and exists horizontally via an outlet plumbing elbow, provided with and attached to the disposer at its lower side, which leads through a 90° bend vertically downwardly into the upper inlet end of a standard plastic or brass tubular plumbing trap. The disposer may also have a dishwasher drain line connected into the upper side thereof that feeds waste water from the dishwasher through the disposer and out of the disposer outlet.

Hitherto, a serious problem has existed with respect to undercounter R/O Systems installations, particularly retrofit installations, with respect to the manner and means for connecting the outlet end of the waste water drain line, downstream of the air gap, to the standard disposer drain plumbing fittings conventionally encountered in most household plumbing systems. All plumbing codes (and most R/O manufacturer's warranties) now prohibit the connection of R/O waste water drain line anywhere in the outlet plumbing elbow of the disposer because of the danger of clogging by the relatively high velocity discharge from the disposer when the same is operated in the disposal grinding mode to grind and wash down garbage and similar refuse.

Such codes also require the R/O waste water drain line to be connected upstream of a suitable sewer trap. Hence in the case of single compartment, disposer-equipped sinks there may be no alternative for the R/O System installer but to run the R/O waste water drain line down through the kitchen floor to a laundry sink standpipe or available basement or cellar floor drain. Of course, this procedure is expensive and time consuming from the labor and material standpoint, and in some instances a suitable connection of this type may not be economically feasible or even available, thereby effectively presenting installation of the R/O System.

Even in those residential kitchen sink installations which are provided with a double compartment sink, certain installation problems remain. In such double sink installations one of the sinks or sink compartments carries the garbage disposer, and the other, non-disposer sink, has its waste water outlet connected via standard plumbing fittings, which includes a horizontal outlet run leading into a conventional baffle Tee-fitting connected between the disposer elbow and sink drain trap. This disposer Tee has an interior baffle which operates to divert the downward discharge from the disposer elbow away from and past the Tee-inlet connected to the non-disposer sink plumbing. Plumbing codes permit the R/O waste water drain line connection to enter such non-disposer sink waste plumbing upstream of the disposer baffle Tee because of the isolation provided by its interior baffle. Accordingly, commercially available R/O System installation equipment often includes conventional drain saddle hardware fittings, i.e., split clamp straps, mounting fasteners and an associated drain saddle elbow for making this waste water drain connection to such existing plumbing fittings. However, this requires that a suitable hole be drilled into either the vertical or horizontal run of the non-disposer sink outlet plumbing fittings, and the drain saddle clamp fitting registered and clamped to communicate the elbow with the drilled hole.

Although kitchen double compartment sinks thus can legally accommodate connection of the R/O waste water drain line in the immediate vicinity of the undercounter R/O System installation, all state and local plumbing codes now prohibit the use of saddle-type valves and/or drain connections. (See article entitled "Drain Saddle Controversey Spawns Alternatives" and subtitled "Will innovations resolve an old problem?") by Dennis Bowman on pp. 34 and 36 of the July, 1995 issue of *Water Technology* (Volume 18, No. 7)). Hence in such states, even with a double compartment sink plumbing arrangement incorporating a disposer baffle Tee, the R/O waste water drain line outlet again must be run from under the kitchen counter to the basement or some other area having a standpipe or drain arranged to feed into a suitable entry point to the household sewer system, such as the aforementioned laundry sink standpipe or basement floor drain. Such waste water drain line connection problems have seriously impeded or prevented retrofit installations of R/O filter systems in existing dwelling structures, particularly in older residences and in well developed older communities supplied with municipal water, where such R/O water filter systems are particularly needed.

Accordingly, it is an object of the present invention to provide an improved R/O waste water drain line outlet connection system and adapter coupling hardware which overcomes the aforementioned problems in a simple, efficient, reliable and economical manner.

Another object of the present invention is to provide an improved drainage system and improved adapter coupling fittings for safely and readily coupling the R/O waste water drain line to existing household single sink disposer outlet plumbing in the immediate vicinity of the undercounter R/O filter system installation.

Yet another object of the present invention is to provide a simple and inexpensive plumbing adapter coupling fitting improvement for connecting the waste water drain line to the existing undercounter single or double sink plumbing, whether or not equipped with a garbage disposer, and which is easy to install and highly compatible with existing inexpensive plastic or brass tubular slip joint (S/J) undercounter type plumbing fittings as well as with heavier duty commercial plastic or brass tubular plumbing fittings of conventional design and standardized, code-approved construction.

A further object of the present invention is provide an improved waste water drain line outlet adapter coupling fitting of the foregoing character which can be either pre-assembled or readily assembled and disassembled on site with no tools.

Still further objects are to provide improved waste water drain systems and associated improved adapter coupling fittings in various forms embodying common features for use either with the aforementioned R/O water filtrations systems or with other water treatment appliances having like bypass or backflow outlet drain tubing requirements, and wherein the improved fittings are (1) quick and easy to install and remove; (2) reliable and (3) quiet in operation; (4) inexpensive to manufacture; (5) have a long and useful service life; (6) are fully compatible with standard commercially available undercounter thin wall or heavy wall commercial slip joint (S.J.) plumbing fittings, and (7) are readily convertible to a form that provides air gap anti-siphon operation in an improved manner.

Another object is to provide an improved method of easily and quickly installing the aforementioned improved adapter coupling fittings in various conventional and existing household and commercial drain plumbing hook-ups to readily convert the same to thereby provide improved R/O and/or other waste, bypass, or backflush liquid drainage systems.

BRIEF DESCRIPTION OF THE DRAWINGS

Other objects, features and advantages of the present invention will become apparent from the following detailed description, appended claims and accompanying drawings (which are drawn to scale unless otherwise indicated), in the several figures of which like reference numerals identify like elements, and wherein:

FIG. 8 is a fragmentary elevational view of a double compartment sink kitchen counter set-up with a disposer carried by one sink compartment and the non-disposer sink compartment drain plumbing coupled to the disposer outlet plumbing and having a sixth embodiment adapter coupling of the present invention connected into the non-disposer drain line and serving as the R/O waste water drain connection.

FIG. 9 is a fragmentary elevational view of the circled portion of the set up of FIG. 8 illustrating a sixth embodiment system connection utilizing the sixth adapter coupling embodiment of FIG. 8 reoriented for the waste water drain connection.

FIG. 10 is a seventh embodiment adapter coupling alternatively usable in the system of FIG. 5.

FIG. 11 is an eighth embodiment adapter coupling alternatively usable in the systems of FIGS. 8 and 9.

FIG. 12 is a top plan view of a presently preferred ninth embodiment of the waste water adapter coupling improvement of the present invention alternatively usable in the system of FIGS. 2, 5, 8 or 9.

FIG. 13 is a side elevational view of the adapter coupling of FIG. 12.

FIGS. 14 and 15 are respectively vertical and horizontal cross-sectional views taken respectively on the lines 14—14 and 15—15 of FIGS. 12 and 13.

FIGS. 16, 17, 18, 19 and 20 are fragmentary perspective exploded views illustrating sequential installation procedural steps utilized in installing the adapter coupling of FIGS. 12–15 in a system corresponding to that of FIG. 2.

FIG. 21 is a fragmentary perspective view of the completed installation following the procedure of FIGS. 16–20.

FIG. 22 is a fragmentary vertical cross-sectional view of the portion of the completed installation of FIG. 21 encompassed by circle A of FIG. 21.

FIG. 30 is a fragmentary elevational view of the completed double compartment sink installation following the steps of FIGS. 26–29.

FIG. 31 is a fragmentary exploded perspective view illustrating installation procedure steps utilized in installing the ninth embodiment adapter coupling to a single compartment sink without disposal and corresponding to the installation of FIG. 9.

FIG. 32 is a vertical cross-sectional view of a tenth embodiment adapter coupling of the invention provided for use with commercial (e.g., restaurant) applications but shown installed in FIG. 32 in the undercounter thin-walled plumbing fitting of FIG. 22., FIG. 33 is a part elevational, part vertical center cross-sectional view of the tenth embodiment coupling adapter installed on a standard trap adapter commercial-type plumbing fitting for coupling to larger-diameter, heavier-walled commercial-type drain line plumbing.

FIG. 34 is a fragmentary perspective view illustrating the coupling of FIG. 33 mounted on a commercial drain line tube plumbed through a commercial trap to a vertical commercial drain pipe.

FIG. 35 is a semi-diagrammatical elevation view of the tenth embodiment adapter coupling mounted on commercial-type floor drain plumbing fittings.

FIG. 36 is a part elevational and part center sectional view of an eleventh embodiment adapter coupling of the invention provided with an air gap structure and also intended for use with commercial applications.

FIG. 37 is a view similar to that of FIG. 36 but showing the adapter coupling of FIG. 36 but rotated therefrom 180° about a vertical axis, and with a portion broken away to illustrate interior detail.

FIGS. 38 and 39 are vertical cross-sectional views taken respectively on the lines 38—38 of FIG. 36 and 39—39 of FIG. 38.

DETAILED DESCRIPTION OF THE PRESENTLY PREFERRED EMBODIMENTS

First Embodiment Waste Drain System and Coupling

Figure 1:
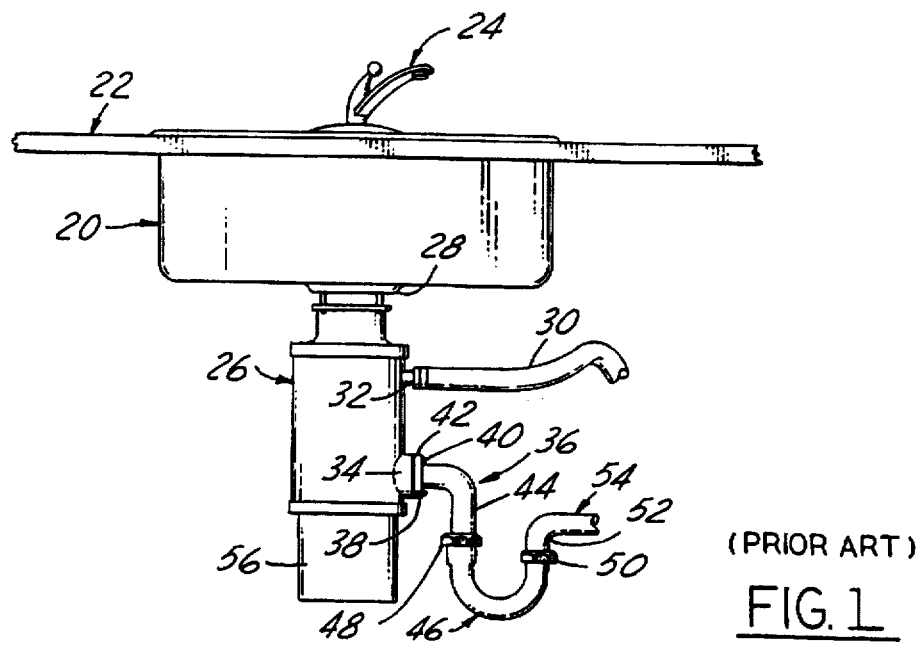
FIG. 1 is a fragmentary elevational view of a typical household single compartment sink kitchen counter installation shown prior to the installation of the R/O filter system adapter fitting improvements of the present invention and having a conventional garbage disposer installed therebeneath, a dishwasher drain line being connected to the disposer upper side inlet and the disposal outlet elbow connected via a conventional trap to a horizontal waste line.

Referring first to FIG. 1, a typical residential kitchen counter single compartment sink installation is illustrated prior to retrofit installation of an R/O system in accordance with the present invention. Such a single sink set-up includes a single compartment sink 20 mounted through a suitable opening in a kitchen counter 22, and an associated conventional water dispensing faucet 24 (herein illustrated as a single lever hot and cold water mixing faucet). A conventional garbage disposer 26 is suspended in the usual manner from sink 20 with its upper main inlet in communication with the single sink waste outlet 28. An undercounter automatic dishwasher unit (not shown) has its dishwater drain line 30 connected to the upper side inlet fitting 32 of disposer 26. The outlet 34 of disposer 26 is coupled to a disposer elbow 36 by a flange clamp 38 and associated mounted bolts 40, the connection being sealed by a disposer drain gasket 42. The vertical run 44 of elbow 36 is typically connected to a conventional sink trap 46 by a slip joint nut 48 and associated slip joint beveled washer (not shown). The outlet end of trap 46 is similarly connected by a slip joint nut 50 to the elbow 52 of a horizontal waste line 54 leading to the main sewer drain of the household. Typically the garbage disposer installation instructions require that the disposer waste line 54 and associated trap 46 be plumbed at the appropriate elevation to prevent standing water in the disposer motor housing 56.

It is to be noted that the single sink/disposer installation of FIG. 1 cannot accept a waste water drain connection from an R/O filter system because there is no place to connect the drain saddle provided with such a system to the disposer waste line. The saddle cannot be connected to the horizontal waste line 54 since it is downstream of trap 46, nor can it be connected to the elbow 36 without voiding the system manufacturer's warranty and violating the laws and plumbing code ordinances (plumbing codes or Uniform Plumbing Code) of substantially all towns and municipalities. Hence the R/O waste water drain line hitherto had to be run through a hole drilled in the kitchen floor to a basement laundry sink standpipe or to closest available basement or cellar floor drain. If such drains were not available or accessible this condition has in most instances forestailed installation of the desired R/O filter system. Moreover, even if such remote drain connections were available, the cost of running the waste water drain line to the same often was uneconomic and/or created maintenance problems due to the excessive length and small diameter of such waste water tubing increasing the risk of clogging.

Figure 2:
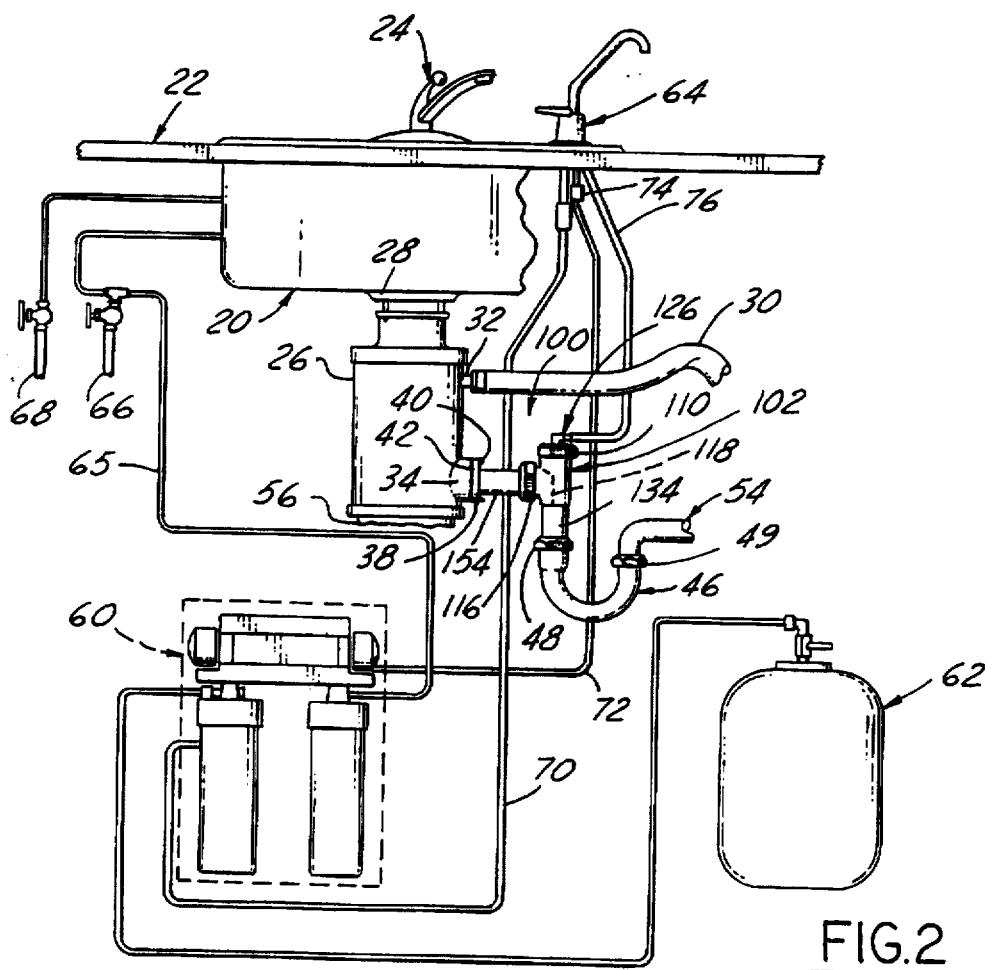
FIG. 2 is a fragmentary vertical elevational view of the single sink and disposer equipment of FIG. 1 after installation of an R/O System incorporating a first embodiment of the waste water outlet coupling system and adapter apparatus of the present invention.

However in accordance with a principle feature of the present invention, a conventional R/O filter system designed for undercounter installation now can be easily and unexpensively installed in such a single sink/disposer set-up so as to utilize the disposer waste drain line to receive the reject waste water from the R/O system. Referring to FIG. 2, the single sink/disposer kitchen counter installation of FIG. 1 is shown in conjunction with the installation of a typical commercially available reverse osmosis drinking water appliance (illustrated diagrammatically). Such a commercial residential R/O drinking water appliance preferably is that made by Water Factory Systems (a unit of Commercial Intertech) of Irvine, Calif., Series N4000, N4500 or N5000, and typically includes a purification assembly 60, a storage tank 62, and a filtered water dispensing faucet and air gap module assembly 64. Unfiltered potable water is supplied to the system via a tubing connector 65 connected to the existing cold water supply line 66 which is usually run adjacent to the household hot water supply line 68. Fully filtered product water is delivered from the R/O system via a tubing connector 70 connected to the dispensing faucet assembly 64. The R/O system reject waste water is conducted by a tube 72 leading up to the vertical spout 74 of the air gap assembly included in faucet assembly 64. This R/O waste water is then returned from the air gap assembly via the R/O waste water drain line tubing 76 to a waste water drain coupling 100 provided in accordance with the present invention.

Figure 3:
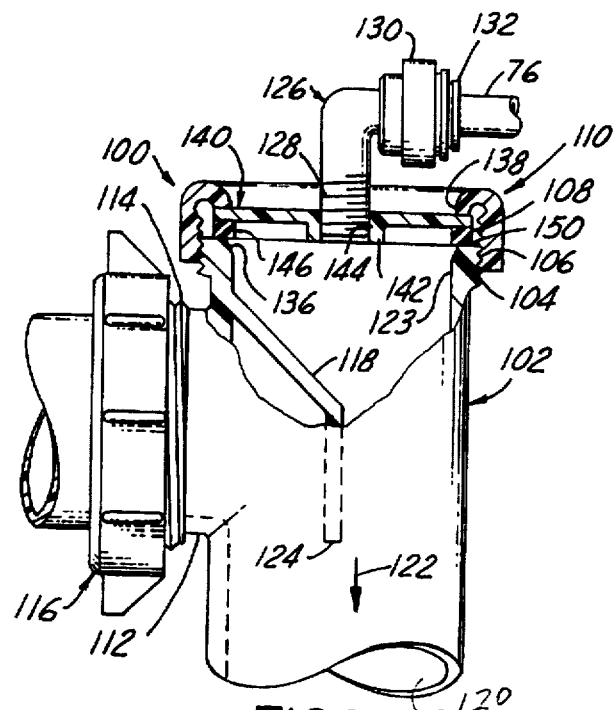
FIG. 3 is an enlarged fragmentary elevational and part center-sectional view of the first embodiment of the waste water adapter coupling improvement of the present invention as utilized in the system of FIG. 2.

As best seen in FIG. 3 in conjunction with FIG. 2, coupling 100 is made up almost entirely of inexpensive, commercially available slip-joint (S/J) type tubular plastic (or brass) plumbing fitting currently mass produced for the household residential as well as commercial market by such companies as Dearborn Brass, Plumbing Wholesale Division of 21st Century Companies, Inc., of Tyler, Tex., and Brass Craft of Southfield, Mich. Thus, the primary component of coupling 100 is a standard commercially available plumbing fitting known as a "baffle Tee" 102 (e.g., Dearborn Plastic Baffle Tee Part No. 9185, "1½" End Outlet Slip Joint"). Baffle tee 102 is injected molded from polypropolyne material (PP) and has an external flange 104 at its upper end provided with external threads 106 for threadably receiving the internal threads 108 of a standard slip joint nut 110 (e.g., Dearborn Brass Part No. 9001, 1½" "Slip Joint Nut").

Tee 102 has an upper side inlet in the form a tubular projection 112 provided with external threads 114 to threadably receiving a second S/J nut 116 identical to nut 110. Tee 102 is also provided with a standard interior baffle 118 to divert the incoming garbage disposal liquid waste products, entering via inlet 112 into the main throughbore 120 of fitting 102, downwardly in the main flow direction of the fitting as indicated by the flow direction arrow 122 provided on the exterior of the fitting. In the normal use intended for Tee 102, another standard S/J type plumbing fitting, such as a sink tail piece, would have its unflanged, "tail-end" outlet inserted into the upper end inlet portion 123 of bore 120. Baffle 118 is normally intended to also divert incoming liquid flow entering from the outlet of such an associated S/J tubular conduit away from the liquid flow entering via inlet 112, the two input flows merging downstream of the lower end 124 of baffle 118. Such standardized baffle tees are required by the Uniform Plumbing Code when the outlet fitting(s) from the garbage disposer is to be tee-connected in parallel to another sanitary waste line upstream of the trap 46 of the undersink plumbing system.

Coupling 100 also includes a drain elbow such as another standard and readily available part, namely, a drain elbow 126 customarily provided with the commercially available reverse osmosis drinking water appliance equipment. Elbow 126 has an external (male) national pipe thread 128 provided at its outlet nipple end. Fitting 126 preferably is also provided (by the R/O appliance manufacturer) with a "Push-In" connector 130 which includes a push-in catch and release collet 132 and associated O-ring seal 133 (shown in FIGS. 14, 22–25 and 32) for quickly and releasably attaching the outlet end of the R/O waste water drain tube 76.

Referring to FIG. 2, Tee 102 also has a reduced diameter sleeve portion 134 designed as a "slip-end" in accordance with industry standards for slip feeding through the S/J nut 48 (and a customarily associated S/J beveled washer) of the trap fitting 46 or other S/J plastic or brass tubular plumbing fittings of the same nominal diameter rating. Tee 102 also has a chamfer 136 (FIG. 3) at its upper inlet end designed to cooperate with a standard slip joint (S/J) beveled polyethylene washer W (shown in FIGS. 20 and 22). Such a S/J beveled washer is adapted to be clamped between the ID lip 138 of S/J nut 110 and chamfer 136 as the nut is threaded downwardly on external threads 106 of Tee 102 to thereby squeeze inner periphery of the washer against the mating tail sleeve of another S/J plumbing, such as the aforementioned sink tail piece, fitting inserted into the upper end of Tee 102. However, such an S/J beveled washer is preferably not used in coupling 100 of the invention when constructed as illustrated in FIG. 3.

In accordance with a principle feature of the first coupling embodiment of the present invention, the foregoing commercially available inexpensive plumbing fittings, namely Tee 102, S/J nut 110 and saddle drain elbow 126, are converted for use in R/O waste water drain coupling 100 by providing in combination therewith only one custom made additional part, namely an adapter part in the form of an elbow fitting closure plate 140 (FIG. 3). Plate 140 in the embodiment of FIG. 3 is preferably in the form of an imperforate thin, flat, circular disc made of a suitable, durable rigid material such as brass or plastic (such as PVC, PP or "Plexiglas" plastic material) having an outside diameter adapted to be received with a close sliding fit within the S/J nut integral threads 108. Plate 140 preferably is also provided with an integral central boss 142 projecting vertically downwardly from the lower (fitting-interior) surface of plate 140 and provided with a through-bore having internal pipe threads 144 for threadably and sealably receiving the male pipe threads 128 of the nipple end of elbow 126. Although boss could project upwardly from the upper surface plate 140, the interior orientation of boss 142 is preferred in order to provide as much vertical clearance space as possible between elbow 126 and waste line 30.

Alternatively, closure plate 140 may constitute a simple flat circular disc (not shown) having an unthreaded center opening for slidably receiving elbow-nipple threads 128 therethrough. Elbow 126 and plate 140 in this alternative are removably secured together by standard hex-nuts (not shown) threaded on threads 128, one above and one below the disc, along with a suitable washer(s) (not shown) for sealing this disc-elbow-subassembly. However, such an alternative is not preferred since it probably would not meet most plumbing codes.

Plate 140 is sealed liquid tight on the upper end of Tee 102 by placing a suitable conventional thin flat rubber washer 146, properly size-rated, between plate 140 and the upper end of Tee 102. Screwing S/J nut 110 downwardly on Tee 102 will squeeze washer 146 between plate 140 and the flat upper end surface 150 of Tee 102. It is to be noted that the standard slip joint beveled washer (not shown, described above) should not be used in place of the flat washer 146 in the construction shown in FIG. 3 because there is no tail sleeve surface present in coupling 100 for it to compress against. Such an S/J beveled washer would also diminish the threaded overlap engagement of nut 110 with threads 106 by more than the thickness of washer 146.

The manner of retrofit installation of the R/O reject water conversion kit of the invention, in the case of a single compartment sink equipped with a disposer, is best seen by comparing the respective "before" and "after" FIGS. 1 and 2. The various components and tubing connections of the commercially available R/O system are installed as described in conjunction with FIG. 2 by following the manufacturer's installation literature instructions, except for the outlet connection of the waste water drain tube 76. The installer then performs the following steps:

1. Remove disposer elbow 36 by first removing bolts 40 and decoupling clamp 38, and then loosen S/J nut 48 so that disposer elbow 36 can be slid upwardly and outward of trap 46.

2. Swing trap 46 away from disposer 26 (loosening its other S/J nut 149, if necessary) to provide additional working clearance, and then insert the tail piece 134 of the disposer Tee 102 through S/J nut 46 into the upper end of trap 46.

3. Utilizing a proper diameter standard sink tail piece 154 (e.g., Dearborn Plastic Part No. 9799, 4 inch; 9800, 6 inch; 9801, 8 inch; or 9803, 12 inch), install a new disposer drain gasket 42 on the flanged end of tail piece 154 by pressing the inside slot of the gasket over the flange, evenly seated, so that the thick end of the gasket 42 faces disposer 26 and the gasket release end faces Tee 102.

4. Temporarily hold the flanged end of tail piece 154 against the disposal drain outlet and the other, slip end adjacent the disposal Tee inlet 112, mark for cut-off length, and then cut the slip end of the tail piece to the appropriate length for insertion into Tee inlet 112.

5. With tail piece 154 so cut to appropriate length, install the flanged end of tail piece 154 onto the disposer outlet 34 using the original mounting clamp 38 and bolts 40.

6. Then swing trap 46 with Tee 102 thereon towards disposer 26 until the Tee inlet 112 telescopically receives the slip end of tail piece 154 and firmly seats thereover.

7. Then tighten the disposal clamp bolts 40 and the S/J nut 116 to firmly clamp and seal tail piece 154, and tighten S/J nut 48 to firmly secure and seal lower slip end 134 of Tee 102 in tap 46. Check and re-tighten S/J nut 49.

8. Next, position washer 146 on the upper end of Tee 102, sub-assemble closure plate 140 and S/J nut 110 as shown in FIG. 3, and then sub-assemble elbow 126 by screwing elbow nipple thread 128 into threads 144 of plate boss 142 until firmly seated (after suitably doping the threads with pipe sealant); then plate closure plate-nut-elbow subassembly 110-126-140 on washer 146 and orient tube 76 in the desired angle or direction (normally toward the faucet assembly 64); and then tighten S/J nut 110 to firmly secure and seal closure 140 on Tee 102.

9. Install outlet end of tube 76 into push-in connector 130 of elbow 126.

With coupling 100 of the invention so installed on the single sink/disposer set-up system of FIG. 2, and assuming the other set-up and check out procedure normally associated with the reverse osmosis drinking water appliance equipment has been completed, the system of FIG. 2 is now ready for operation. The reject water from the reverse osmosis filter system will flow via tube 76 down through fitting 126 into the upper end of Tee 102 and then downwardly to trap 46 for disposal into the household sewer system. Normal water drainage from sink 20 as well as garbage disposal refuse forcibly ejected via the outlet of disposer 26 will enter Tee 102 via inlet 112 and be diverted downwardly by the baffle 118. Tee baffle 118 thus ensures functional isolation of the garbage disposer outlet flow from the waste water drain flow. In addition, the position of elbow 126 above disposer outlet 34 by its mounting on the upper end of Tee 102 further isolates the two flows and helps to further prevent contamination of the waste water fitting 126 and tube 76. Coupling 100 of the invention thus is designed to satisfy the Uniform Plumbing Code for waste drain liquid systems arranged in parallel waste flow with disposer 26.

Second Embodiment Coupling

Figure 4:
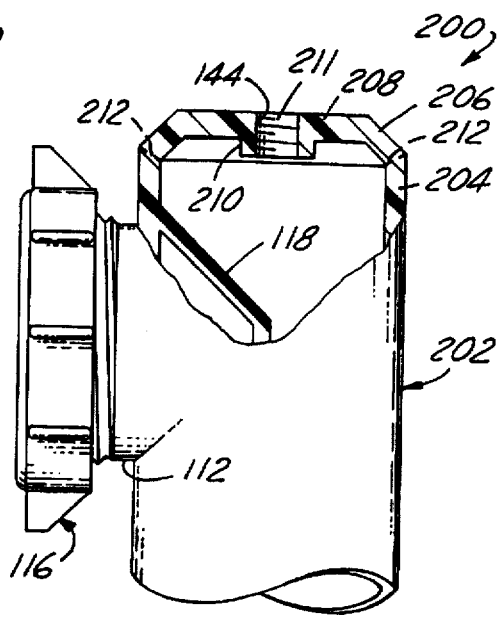
FIG. 4 is a second embodiment of a waste water adapter coupling improvement of the present invention alternately usable in the installation of FIG. 2.

FIG. 4 illustrates a second embodiment coupling 200 of the invention as comprising a modified baffle Tee 202 which may be made identical to Tee 102 except for the upper end adapter structure of the Tee. The upper end of the main cylindrical wall 204 of Tee 202 is joined integrally by a frusto conical wall 206 to a flat, transverse end closure wall 208. A protruding boss 210 is integrally formed centrally of wall 208, preferably, like boss 142, extending downwardly from the interior surface of wall 208. Boss 210 has a through-opening 211 internally threaded with pipe threads 144 to threadably receive the nipple end of drain saddle elbow 126 in the manner of the coupling 100. The modified baffle Tee 202 of coupling 200 thus is a custom-made plumbing fitting intended for use as an alternate to coupling 100 when connecting the R/O waste water drain line 76 to a single compartment sink/disposer installation in the manner of FIGS. 1 and 2. Tee 202 may be readily mass produced initially in two parts from plastic by injection molding one part as the main body of the baffle Tee (with inlet 112 and baffle 118) so that its upper end terminates at a joint line 212, and the closure made as the other part comprising the conical wall 206, end wall 208 and boss 210. These two piece parts are then subsequently permanently joined at joint 212 by any suitable means such as adhesive, ultrasonic welding, etc. Due to the initial molding and assembly tooling costs, modified baffle Tee 202 of coupling 200, if produced in low quantities is more expensive than coupling 100 but is cost effective in high volume because it simplifies somewhat the assembly task of the installer because it eliminates the cost of washer 146 and the S/J nut 110 and their assembly time.

Second Embodiment Waste Drain System and Third Embodiment Coupling

Figure 5:
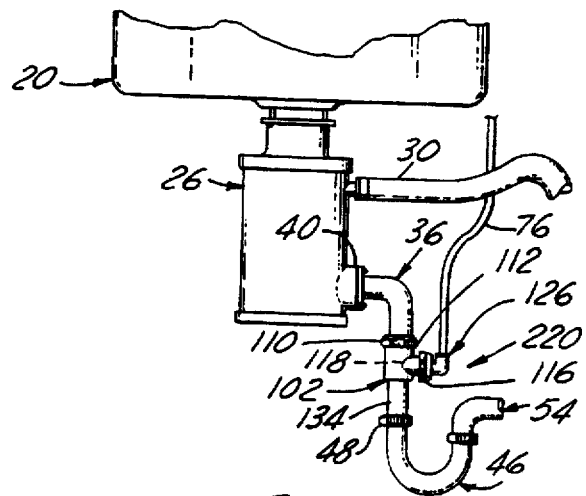
FIG. 5 is a fragmentary elevational view of a second embodiment of the waste water drain system for the single sink/disposer set-up of FIG. 1 utilizing the first embodiment adapter coupling of FIGS. 2 and 3 assembled in an alternate manner as a third embodiment coupling for use in the second embodiment system.

FIG. 5 illustrates a second embodiment of a waste water drain hook-up system and a modified third embodiment coupling 220 which uses the same components as coupling 100 of FIGS. 2 and 3. Coupling 220 is preferably utilized in those installations where trap 46 is or may be positioned at a lower elevation relative to disposer 26 than that illustrated in FIGS. 1 and 2. If this possibility exists in a given undercounter installation set-up, then installation can be further simplified because disposer elbow 36 need not be removed and replaced by tail piece 154 as prescribed in the installation of coupling 100. Instead coupling 220 uses baffle Tee 102 re-connected to receive the lower slip end of elbow 36 through its upper end inlet portion 123, and is secured thereto by S/J nut 110 and an associated S/J beveled washer. The slip end sleeve 134 of Tee 102 is inserted into the upper end of trap 46 and secured therein by tightening S/J nut 48. Then R/O waste water tube 76 and associated saddle drain elbow 126 can be interconnected into the drainage system by utilizing the side inlet 112 of Tee 102 and associated S/J nut 116. The orientation of Tee 102 in coupling 220 is thus rotated 180° relative to disposer from its orientation in coupling 100. However interior baffle 118 still functions to isolate the incoming disposer waste coming down from elbow 36 into Tee 102 from the waste water entering inlet 112 from tube 76 in accordance with the Uniform Plumbing Code. In those situations where trap 46 is disposed at an even lower elevation than that illustrated in FIG. 5 relative to disposer 26, an extension tail piece may be plumbed to Tee slip end 134 and connected to the inlet of trap 46 in accordance with conventional slip joint plumbing fitting practice. In either instance, the installation of coupling 220 is simpler than that of coupling 100 since disposer elbow 36 need not be dismantled and replaced by tail piece 154.

Third Embodiment Waste Drain system and Fourth Embodiment Coupling

Figure 6:
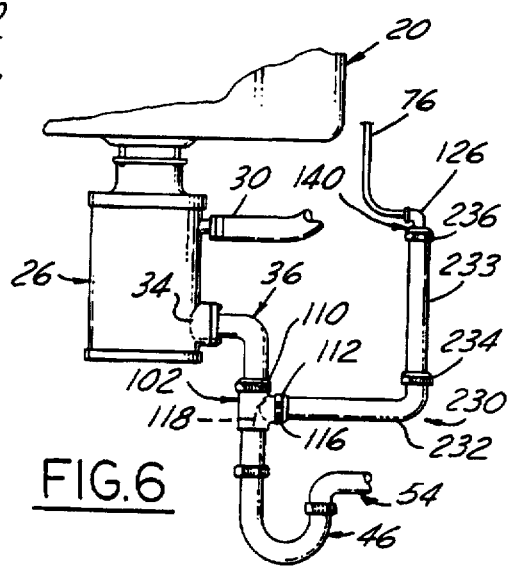
FIG. 6 is a third embodiment system employing a fourth embodiment adapter coupling of the invention applied to the single sink/disposer set-up of FIG. 1.
Figure 23:
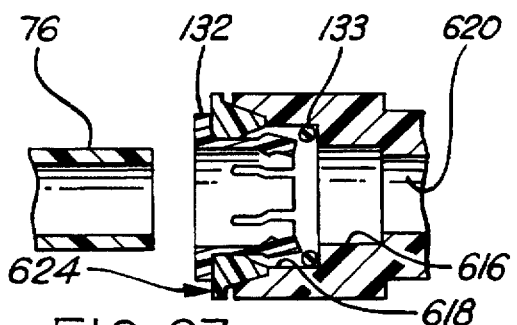
FIGS. 23, 24 and 25 are fragmentary center sectional views illustrating the use and operation of the standard commercially available speed fit/push-in connector preferably provided as an integral part of the adapter coupling of the invention and preferably used in all embodiments of the invention.
Figure 24:
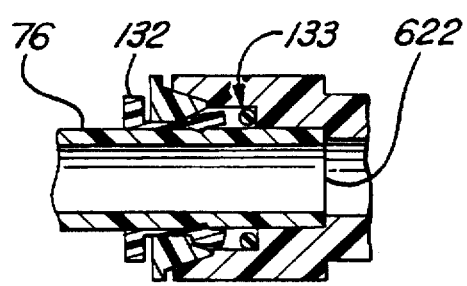

FIG. 6 illustrates a third embodiment of a waste water drain installation system for a single compartment sink/ disposer set-up for those installations where trap 46 can be disposed at the elevation indicated in FIG. 5 relative to disposer 26. Disposer baffle Tee 102 is assembled to drain 46 and disposer elbow 36 in the same manner as the FIG. 5 installation. However the waste water drain tube 76 outlet is connected at a substantially higher elevation into the waste line by utilizing a fourth embodiment coupling 230 of the invention made up of a standard quarter bend plumbing fitting 232 (e.g., Dearborn Plastic Part No. 9006), and a standard extended tail piece 233 (i.e., having a threaded instead of flanged end; e.g., Dearborn Plastic Part No. 9792). The slip end of fitting 232 is inserted into the S/J nut 116 and side inlet 112 of Tee 102 so as to extend horizontally from Tee 102. The quarter bend portion of fitting 230 is oriented upright to receive the slip end of tail piece 233 and its S/J nut 234 is tightened thereon to support tail piece 233 upright as illustrated in FIG. 6. The upper end of tail piece 233 is provided with slip joint nut 110 and associated closure piece 140, washer 146 and elbow 126 in the same manner as these parts are assembled to the upper end of baffle Tee 102 in FIG. 3.

With the system of FIG. 6 the garbage refuse and waste forcely discharged from disposer outlet elbow 36 is isolated from the R/O waste water drain water by baffle 118 of Tee 102 as well as by the separation and standpipe effect of fittings 232 and 233 to thereby further protect waste water tube 76 from clogging and contamination.

It is also to be understood that such standpipe isolation can be incorporated into the coupling 100 and system of FIG. 2 by inserting a tail piece 232 into the upper end of Tee 102, with elbow 126 and closure plate 140 and washer 146 (as illustrated in FIG. 3) assembled to the tail piece threaded upper end as in FIG. 6, instead of coupling elbow 126 directly to the upper end of fitting 102.

Fourth Embodiment Waste Drain System and Fifth Embodiment Coupling

Figure 7:
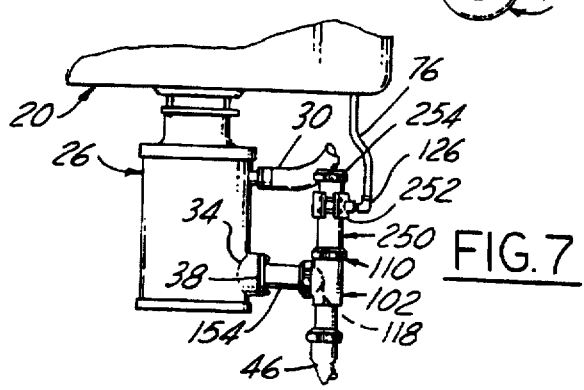
FIG. 7 is a fourth embodiment connection system employing a fifth embodiment adapter coupling of the invention.

FIG. 7 illustrates another embodiment of a single compartment sink/garbage disposer R/O waste water drain installation set-up in accordance with the present invention, for use in those jurisdictions which permit the use of saddle-type drain connections under their plumbing codes for connection of waste water drain lines upstream of code approved sink drain traps. The system of FIG. 7 utilizes tail piece 154 connected to the disposer outlet along with a baffle Tee 102 coupled to the upper end of trap 46 in the manner of FIG. 2. However, the upper end of Tee 102 is left open and the slip end of a standard extended tail piece 250 is inserted into the upper end inlet portion 123 of fitting 102 (see FIG. 3) and secured therein in a sealed manner by the S/J nut 110 and associated slip joint bevel washer (described previously, not shown). An appropriate hole is drilled in the side of tail piece 250 near the upper end thereof, and the saddle drain clamp 252, customarily provided with the R/O system appliances is clamped about tail piece 250 with the outlet of the clamp 252 registered with the drilled hole in tail piece 250. The saddle elbow 126 is threaded into the socket of clamp 252 and tube 76 inserted in the push-in coupling 130, provided with elbow 126.

The normally open upper end of tail piece 250 in accordance with the present invention, is closed and sealed liquid and gas tight by providing a modified closure plate (not shown) which, like closure 140, is a thin, flat rigid circular disc made of brass or plexiglas but without the center opening 144 or mounting boss 142 of plate 140. This closure disc plate is mounted between a washer (identical to washer 146 of FIG. 3) and an S/J nut 254 (identical to nut 110) in the manner in which closure plate 140 is mounted on Tee 102 in FIG. 3. The installation of FIG. 7 thus meets the Uniform Plumbing Code insofar as the same is isolated from the disposer discharge by baffle Tee 102, and also provides standpipe vertical isolation by the elevated mounting of elbow 126 relative to the disposer discharge outlet 34. However, as previously indicated, the installation system and coupling of FIG. 7 is not usable in those jurisdictions listed above which prohibit use of saddle drain hardware connections.

Fifth Embodiment Waste Drain System and Sixth Embodiment Coupling

FIG. 8 illustrates an R/O waste water drain line installation in accordance with the invention applied to a conventional double compartment sink installation wherein a non-disposer sink compartment 300 is mounted in the kitchen counter 22 immediately adjacent the disposer-equipped sink compartment 20. The sole bottom outlet 302 of sink 300 is connected to a waste line comprising a conventional flanged tail piece 304 having its lower slip end inserted through a slip joint nut 306 and into the upper end of a slip joint elbow fitting 308. In accordance with a principal feature of this embodiment of the invention, a sixth embodiment waste water coupling 310 connects the horizontal outlet run of elbow 308 to a standard tail piece 312 (both ends are slip ends) having its slip end coupled by S/J nut 116 to baffle Tee 102. Baffle tee 102 is coupled between the disposer outlet elbow 36 and trap 46 in the manner of system of FIG. 5.

Coupling 310 includes a commercially available, standard slip joint plumbing component, namely a three-way slip joint Tee (e.g., Dearborn Plastic Part No. 9679) oriented with its main through bore horizontal and having S/J nuts (and associated S/J beveled washers) 314 and 316 provided at its inlet and outlet respectively coupling thereto the slip ends of fittings 308 and 312. The side or T-inlet 318 of three-way Tee 310 is provided with the S/J nut 110, washer 146, closure plate 140 and saddle drain elbow 126 coupled thereto in the manner in which these parts are coupled in assembled relation to the upper end inlet of Tee 102 in FIG. 3. Waste water drain tube 76 is likewise coupled to elbow 126 in the manner of FIG. 3. Tube 76 connects to an R/O drinking water appliance system installed in the manner of FIG. 2, but illustrations of these previously described R/O system components is omitted from FIG. 8 for clarity.

The double sink installation of FIG. 8 utilizing coupling 310 represents an inexpensive solution to the problem of coupling the R/O waste water drain line to trap 46 in parallel with both the garbage disposer 26 of sink 20 and the sink waste water drain from non-disposer sink 300 by eliminating a saddle drain clamp coupling, also makes it less expensive and easier to install the R/O waste water drain line to the undersink plumbing components typically found in residential household installations.

Sixth Embodiment Waste Drain System

FIG. 9 illustrates the circled portion of the double sink set-up of FIG. 8 with a modified connection system wherein the three-way S/J Tee 310 is re-oriented with its main through-bore vertical and its inlet coupled by S/J nut 314 to the slip end of a short tail piece 320 in turn connected at its upper flange end to the waste outlet plumbing 302 of sink 300. The outlet of fitting 310 is coupled by its S/J nut 316 to the slip end of a standard plumbing fitting 322 which in turn is coupled in a conventional manner through a horizontal run (not shown) to baffle Tee 102 connected as shown in FIG. 8. Hence the modified installation of FIG. 9 likewise meets all applicable plumbing codes for a double sink installation by avoiding the use of a saddle drain clamp for coupling the waste water tube 76 to the non-disposer sink of a single or double sink drain system.

Seventh Embodiment Coupling

Referring to FIG. 10, a modified, custom-made baffle Tee fitting 400 is illustrated fragmentarily and with portions broken away to illustrate detail. Fitting 400 is intended as an alternate to coupling 220 for use with the R/O waste water drain installation system of FIG. 5 and is similar to baffle Tee 102 in having S/J nut 110 (and associated S/J beveled washer) threadably received on its upper inlet end threads 106. Baffle Tee 400 likewise has the standard slip fit extension 134 and interior baffle 118 of Tee 102. However the inlet to Tee 400 is modified from Tee 102 in a manner similar to the modified upper inlet of fitting 202 of FIG. 4. Thus the side or T-inlet of baffle Tee 400 comprises a cylindrical wall protrusion 402 integrally joined at joint line 404 to end closure structure comprising a conical wall portion 466 and an integral flat circular end wall portion 408. An outward protrusion or boss 410 is provided centrally of end wall portion 408 and has an internally threaded through opening 412 adapted to threadably receive the nipple threads 128 of drain saddle elbow 126.

Modified fitting 400 is installed in place of and oriented the same as fitting 102 in FIG. 5. Elbow 126 is similarly threadably coupled to opening 412 of the side inlet of fitting 400. Although fitting 400, like fitting 202, is initially more costly to manufacture because it is a custom fitting versus a coupling utilizing a standard commercially available universal fitting component, if economies of scale or volume are achievable fitting 401 could become cost competitive with fitting 102, and has the advantage of reducing installation labor time and attendant costs. Although conventional injection molding techniques would suggest that the end closure piece 406–412 be made initially as a separate part and permanently joined at joint 404 to inlet 402 by suitable means such as adhesive or ultrasonic welding, it is also possible, of course, to make fitting 400 (as well as fitting 202) as a one piece part by using conventional "lost wax" type investment casting techniques.

Eighth Embodiment Coupling

FIG. 11 illustrates a modified custom-made three way Tee 500 intended as a substitute for the three way coupling 310 of FIGS. 8 and 9 in the double sink installation illustrated therein. Three way Tee 500 of FIG. 11 thus has the same main body portion 502 of coupling 310 as well as the associated S/J nuts (and washers) 314 and 316 respectively provided at its inlet and outlet ends. However, in a manner similar to fittings 202 and 400, the structure for coupling the saddle drain elbow 126 into Tee 500 is provided by a cylindrical wall protrusion 504 joined at a circular joint 506 to a conical wall portion 508 in turn integrally joined to flat end wall portion 510. A central boss protrusion 512 of wall 510 has a pipe-threaded through-opening 514 adapted to threadably receive the nipple threads 128 of elbow 126. Modified fitting 500 is thus substituted for and installed in the same manner as fitting 310 in the installation system of FIGS. 8 and 9 respectively. The manufacturing and installation economics of fittings 202 and 400 thus likewise apply to fitting 500.

From the foregoing description it will now be readily understood by those skilled in the art that the reverse osmosis waste water drain installation system and coupling of the present invention in various embodiments overcome the several problems discussed previously in a reliable, simple, economic and safe manner. The system and coupling embodiments of the present invention now enable rejector waste water drain line of the conventional commercially available reverse osmosis drinking water appliances to be quickly and easily installed in single sink/disposer undercounter household installations, whether existing or newly installed, while satisfying the Uniform Plumbing Code criteria for such waste water hook-ups, as well as complying with manufacturers warranties. The various coupling embodiments and system hook-ups of the invention offer great flexibility in connecting to the various plumbing hook-ups encountered with double sink installations, i.e., a disposer sink 20 and non-disposer sink 300 installed side by side as in FIG. 8. It will also be understood that (e.g., if economically justified by high volume demand for mass production) the integral molded end wall construction of modified couplings 200, 400 and 500 can be substituted for plate 140 at the upper end of tail piece 233 to thereby likewise provide a modified custom tail piece in FIG. 6 for use in place of tail piece 233. Similarly, an integrally molded closure plate can be substituted for the imperforate separate closure plate at the upper end of a custom made tail piece for use in place of tail piece 250 in FIG. 7.

Ninth Embodiment Adapter Coupling

FIGS. 12–15 illustrate a presently preferred R/O waste water drain line adapter coupling 600 of the invention adapted for use in the undercounter plumbing fitting coupling systems of the type illustrated in FIGS. 2, 5, 6, 8 and 9, as further explained in conjunction with FIGS. 16–31, and wherein previously described parts of the coupling system of the invention are given like reference numerals and their description not repeated. R/O drain line adapter coupling 600 is preferably an injection molded part made of a suitable plastic material, such as polypropolyene (PP) or polyvinyl-chloride (PVC), so as to integrally incorporate the R/O drain elbow with the plumbing fitting coupling means which connects the outlet of the elbow with the upper inlet of baffle Tee 102, and which also provides the end closure means operably associated with the elbow and Tee coupling means to close the upper inlet of Tee 102. Adapter coupling 600 thus provides a sealed R/O waste water drain passageway from the R/O waste water drain line 76 into the upper inlet of Tee 102 via such integrated elbow and end closure means of adapter 600.

More particularly, adapter 600 comprises a cylindrical skirt 602 open at its lower end edge 604 and having a uniform outside diameter adapted for a slip fit of skirt 602 into the inlet counterbore 123 of Tee 102 as shown in FIG. 22. When adapter 600 is fully inserted into the upper inlet of Tee 102, the lower edge 604 of skirt 602 abuts the shoulder 125 conventionally provided at the transition between inlet counterbore 123 and the slightly smaller diameter main bore 120 of the reduced diameter slip sleeve portion 134 of Tee 102. The actual length of skirt 602 is preferably slightly greater than one inch so when adapted for use in conjunction with standard one and one-half inch diameter S/J fittings so as to protrude above flange 104 of Tee 102 and slightly above the upper end of the S/J nut 110 in its normal fully-threaded assembled position on Tee 102 as shown in FIG. 22.

The upper end of skirt 602 is integrally joined to a conical dome 606 at an integral annular shoulder junction 608 so that adapter 600 forms a sealed closure for the upper inlet of Tee 102. Dome 606 preferably has a conical angle of about 45° and is configured at its upper end to provide a speed fit/push-in connector assembly "integrally built-in" to thereby form with dome 606 and skirt 602 of adapter 600 a modified R/O drain elbow adapter coupling of the invention.

To this end, a tubular integral inlet nozzle socket protuberance is formed at the apex of crown 606 having a major or longitudinal axis extending preferably perpendicular to the longitudinal center axis of skirt 602. The socket protuberance thus has a generally semi-cylindrical raised inlet channel portion 610 merging, in a direction outwardly from the crown apex, with an enlarged full-cylinder portion 612, which in turn merges at its outer end integrally with a still further enlarged full-cylinder portion 614 which forms the mouth of this barrel-like inlet socket protuberance of adapter 600. Portion 612 has a cylindrical bore 616 sized for the slip fit of the O.D. dimension of tube 76 (such as ⅜ inch). Bore 616 extends outwardly from the crown apex to a larger counterbore 618 formed partially in portion 612 and partially in portion 614. Counterbore 618 receives the O-ring 133 at the shoulder junction between bores 616 and 618. The inner end of bore 616 opens to a slightly smaller diameter downwardly opening passageway 620. The shoulder at the junction of passage 620 and bore 616 provides the interior stop for the inner end 622 of tube 76.

Bore 618 is beveled at its outer end to receive a commercially available double tapered cap-collar 624 which in turn receives the commercially available collet 132 slidably therethrough. Cap collar 624 is preferably ultrasonically Welded to the beveled mouth surface of bore 618 to permanently affix this part of the Speed Fit/Push-In connector in the integral fitting 610–614.

The inlet passage 620 formed in the semi-cylindrical raised protuberance 610 is open through approximately 180° at its underside to the interior of dome 606. Passage 620 at its inner end terminates horizontally at a downwardly curved hemispherical portion 626. The smaller barrel portion 612 is made as a full cylinder and hence protrudes at its underside into the interior space of the conical dome 606 (FIGS. 14 and 15).

Figure 25:
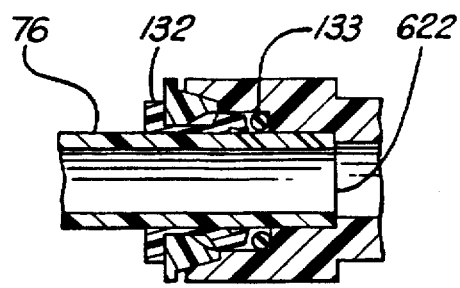

It is to be understood that parts 132, 624 and 133 are commercially available from such manufacturing sources as John Guest U.S.A., Inc. of Totowa, N.J. (such as their Model WC-385-05 ⅜ inch acetal food-grade copolymer collet/cap system) or from Parker Hannifin Corporation of Ravenna, Ohio ("Parflex TrueSeal"™ quick-connect tubing fittings). The operation of such commercially available Speed Fit/ push-in connections are well understood and is shown semi-diagrammatically in the sequence of the views of FIGS. 23, 24 and 25 respectively. As explained generally hereinbefore, to connect the outlet end 622 of R/O drain tube 76 to the such quick-connect fitting subassembly contained in adapter 600, outlet end 622 is manually pushed straight into and through collet 132 about ¾ inch until it abuts the stop shoulder between bores 616 and 620, as shown in FIG. 25. Then a slight separational force manually exerted on tube 76 relative to adapter 600 pulls collet 132 slightly outwardly thereby producing a wedging action with cap collar 624 and thus causing the collet barbs to dig further into the plastic material of tube 76 (typically calibrated nylon polyethylene or similar tube of sufficient rigidity). During this retrograde motion the exterior flange of collet 132 moves slightly away from cap-collar 624 to the tube-holding position of FIG. 24. To release tube 76 from adapter 600 the flange of collet 132 is pushed against cap-collar 624 to thereby release the grip force of the collet barbs on tube 76, thereby freeing tube 76 to be pulled out from the fitting of adapter 160 while the flange of collet 132 is being held pushed in against cap-collar 624.

Preferably adapter coupling 600 of the invention is provided to both the professional and home do-it-yourself markets as a convenient drain line adapter kit. The kit comes in two versions, a "DLA-9" for a single compartment sink equipped with a disposal, and a "DLA-12" for a single compartment sink without disposal or a double compartment sink with or without a disposal on one of the compartments. The DLA-9 kit includes adapter coupling 600, with its built-in tubing quick-connect subassembly, as well as conventional commercially available slip joint (S/J) plumbing fittings including one disposal S/J (baffle) Tee 102, one S/J flanged tail-piece 154, two S/J wing nuts 110 and 116 and two S/J beveled washers W, along with printed installation instructions. This kit in use provides all of the needed materials to make a quick and inexpensive connection of the outlet end of R/O waste water drain tube 76 to the existing undercounter household plumbing system for sink 20 when provided with garbage disposer 26.

FIGS. 16–22 sequentially illustrate the installation procedure using the DLA-9 kit materials for converting the plumbing of a single sink/disposal installation to receive the reject water from an undercounter reverse osmosis appliance to achieve the installed configuration of FIG. 21. This procedure comprises the following steps:

1. Remove the existing disposal ELL 36 (FIG. 16) and J-bend fitting 46 from disposal 26 and trap fitting 54. A bowl should be placed below these fittings during this unhooking procedure to catch trap water.

2. Then, from the tail piece 154 provided in the kit (FIG. 17), cut a new flange tail piece 154' so that the cut end is spaced approximately 1½ to 2 inches from the flange of the tailpiece, i.e., so that when positioned between disposal 26 and the disposal Tee 102 (taken from the kit), tailpiece 154 of Tee 102 will line up and insert into J-bend fitting 46, as illustrated in FIG. 19.

In rare cases, it may be necessary to rotate the disposal 26 and J-bend 46 in order to gain the distance required to line up the new disposal Tee 102. To do this, merely loosen the disposal locking ring of the sink outlet disposal mounting fittings (not shown) and then rotate disposal 26 as desired, then tighten down.

3. Reuse the rubber gasket and mounting flange 38, removed in step 1 from the disposal ELL 36, by mounting the gasket and flange on the new tailpiece 154', as indicated in FIG. 18.

4. Then insert the new drain line adapter coupling 600 of the invention into the top inlet of disposal Tee 102 as shown in FIGS. 20 and 22, preferably until the lower edge 604 of skirt 602 firmly seats on the bottom of the socket formed by wall 123 and shoulder 125 of Tee 102. Then slip S/J beveled washer W over the upper end of the adapter and down along skirt 602 until it is seated on bevel 136 of Tee flange 104 (in the position shown in FIG. 22). Next one of the S/J wing nuts 110 is slipped over adapter 600 and screwed partially down on Tee 102 by engaging the nut threads 108 with the flange threads 106. The internal flange lip 138 of nut 110 will seat on the flat upper surface of the S/J washer W and (during step 7) will force the same downwardly against bevel 136, thereby simultaneously causing bevel 136 to squeeze washer W into tight frictionally grip and sealing embrace with skirt 602.

It will thus be seen that adapter 600 with its turn tailpiece-type skirt 602 is fully compatible to operate as an axially adjustable S/J coupling.

It is to be noted that the slope of dome 606 enables washer W and nut 110 to be slipped over the socket protuberance of adapter 600 during the foregoing subassembly procedure of this step.

5. Then mount the gasket-flange end of cut tail piece 154' with fasteners 40, in the reverse order that disposal ELL 36 was removed (FIG. 18). Then install the side inlet 112 of disposal Tee 102 securely onto cut end of tailpiece 154' using the second S/J washer W and second wing nut 116 provided in the kit (FIG. 19).

6. As indicated in FIGS. 19 and 21, replace J-bend 46 by simultaneously sliding the outlet end of J-bend 46 onto trap fitting 54 and the inlet end of J-bend 46 onto tailpiece 134 of disposal Tee 102. Secure both ends tightly by reusing original S/J nuts 48 and 49 and associated S/J bevel washers (FIG. 21).

7. Next, if necessary, rotate adapter 600 so that the axis of the push-in connector socket protuberance is aligned towards the terminal outlet run of reject water drain tubing 76. Adapter 600 is then secured tightly onto Tee 102 by tightening wing nut 110, so that the foregoing parts are fully assembled and tightly secured as shown in FIGS. 21 and 22.

8. To complete the installation, insert outlet end 622 of tube 76 fully into the push-in connector of adapter 600, as shown in FIGS. 21 and 22.

The installation instructions provided with the aforementioned kit also caution the installer to use only high quality ⅜ inch O.D. tubing of exact size and roundness with no surface nicks or scratches. Also to always make a clean square cut if necessary, using a plastic tubing cutting or sharp razor knife. To assure a leak-free connection, tubing end 622 must seat fully into the bottom of the push-in connector socket. If there is any doubt, the installer is instructed to measure ¾ inch from the end 622 of tube 76 and insert this measured length (when using ⅜" tubing) until the stop of tubing insertion motion is felt as it abuts the internal shoulder at the inner end of bore 616.

With coupling 600 of the invention so installed on the single sink/disposer set-up system of FIG. 21, and assuming the other set-up and check out procedure normally associated with the reverse osmosis drinking water appliance equipment has been completed, the system of FIG. 21 is now ready for operation. As in the first embodiment system of coupling described previously, the reject water from the reverse osmosis of this system will flow via tube 76 down through adapter fitting 600 into the upper end of Tee 102 and then downwardly to trap 46 for disposal into the household sewer system. Again, normal water drainage from sink 20 as well as garbage disposal refuse forcibly ejected via the outlet of disposer 26 will enter Tee 102 via inlet 112 and be diverted downwardly by the baffle 118. As before, Tee baffle 118 thus insures functional isolation of the garbage disposer outlet flow from the waste water drain flow. In addition, the position of adapter inlet passageway 620, well above disposer outlet 34 by its mounting on the upper end of Tee 102, further isolates the two flows and helps to further prevent contamination of the waste water tube outlet 622. Adapter coupling 600 of the invention thus is also designed to satisfy the uniform plumbing code for waste drain liquid systems arranged in parallel waste flow with disposer 26.

As an optional addition, adapter coupling 600 may be provided with an interior back check valve flap 630 (indicated by broken lines in FIGS. 14 and 15). Flap 630 is attached to the inner surface of dome 606 approximately midway between shoulder 608 and the interior protuberance of barrel portion 612, as by adhesive or ultrasonic welding. Flap 630 is slightly flexible and resilient so that it can flex downwardly in response to incoming flow of R/O bypassed waste water so as not to impede such flow, the flap attachment portion serving as the locus of this hinged flexing pivotal opening motion. Flap 630 will swing upward to its closed position illustrated in FIGS. 14 and 15 under conditions of no inflow from tube 76 or back pressure or backflow developing downstream of the adapter. Preferably, flap 630 is made of semi-resilient corrosion resistant material in flat sheet stock, such as polypropylene (PP) or other suitable material compatible with the material of adapter 600.

Figure 26:
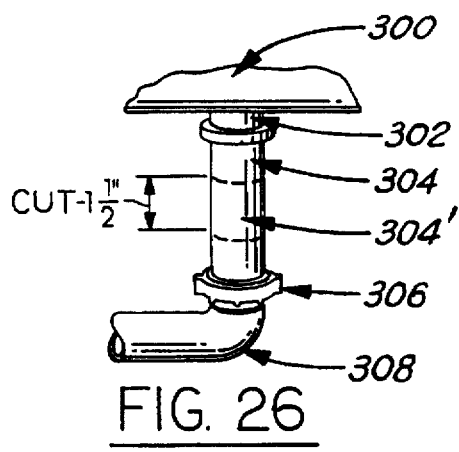
FIGS. 26, 27, 28 and 29 are fragmentary perspective views illustrating sequential installation procedural steps for installing the ninth embodiment adapter of FIGS. 12–15 in a double compartment sink installation corresponding to that of FIG. 8.

The aforementioned "DLA-12" kit provides all needed materials to make a quick and inexpensive connection of the outlet end of R/O waste water drain tube 76 to the existing undercounter household plumbing system normally encountered with a single compartment sink not equipped with a disposal, or for a double compartment sink with a disposal connected to only one of the sink compartments. This kit again includes the same adapter coupling 600 of the invention, as well as commercially available S/J plumbing fittings including one 3-way repair Tee 650 (FIGS. 28–31), three S/J wing nuts 110, 652 and 654 and three S/J beveled washers W. FIGS. 26–30 sequentially illustrate the installation procedures using these DLA-12 kit materials for converting the plumbing of a double compartment sink installation similar to the type shown in FIG. 8. Sink compartment 20 is thus equipped with a disposer 26 and the adjacent sink compartment 300 is conventionally connected to drain into the side inlet of the existing disposal baffle Tee 102. This installation procedure comprises the following steps (for the exemplary vertical installation illustrated in FIG. 30):

1. As shown in FIG. 26, measure the midpoint on the existing vertical tailpiece 304 between the bottom of sink compartment 300 and the horizontal waste ELL 308. A minimum of 4 inches of "exposed" tubing is required.

2. Cut-out one and one half inch of tubing 304 (¾ inch on both sides of the mid-point measurement). Always insure that tube ends are cut squarely and inserted to the bottom of all slip joint sockets.

Figure 27:
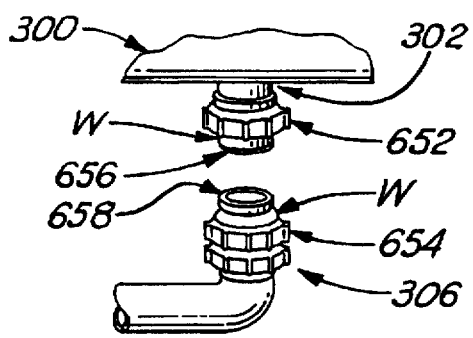
Figure 28:
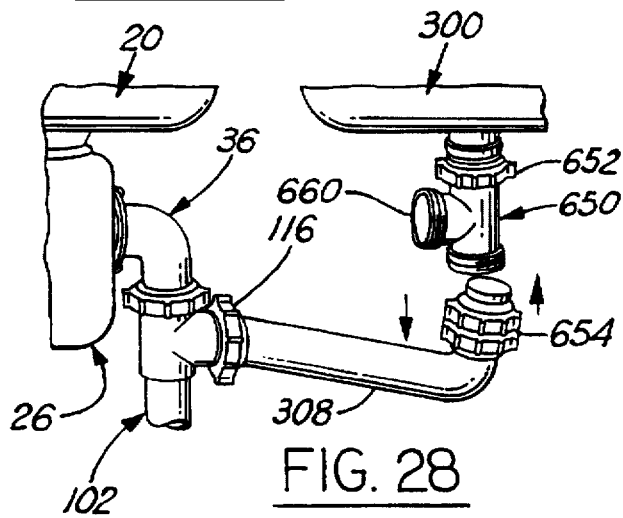

3. Remove the cut-out section 304' and, as shown in FIG. 27, install S/J nut 652 and associated S/J bevel washer W in that order on the upper cut end 656 of tube 304. Likewise, sequentially install S/J nut 654 and associated S/J bevel washer W on the lower cut end 658 of tube 304. Always face the bevel side of washer W towards the fitting 650 to be installed. Then insert the 3-way repair Tee 650, insuring that the tube ends 656 and 658 respectively seat completely into the sockets of the axially opposite ends of Tee 650. As shown in FIG. 28, this may be accomplished by loosening the S/J nut 116 joining the horizontal waste ELL 308 to the disposal baffle Tee 102 until there is enough play to first bend the waste EEL 308 downwardly and then to raise the cut tube end 658 up into the bottom outlet end of Tee 650.

4. Next, rotate the side outlet 660 of Tee 650 to the desired direction for alignment with the R/O waste drain 76. Then firmly tighten the top S/J nut 652 and bottom S/J nut 654 in that order. Then resecure the waste ELL 308 to baffle Tee 102 and tighten S/J nut 116.

Figure 29:
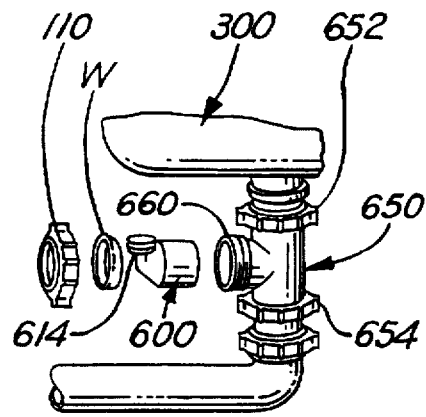

5. As shown in FIGS. 29 and 30, insert the skirt 602 of the new drain line adapter coupling 600 from the kit into the side inlet socket 660 of Tee 650 until it fully bottoms in the socket. Then rotate the quick-connect socket protuberance 614 of adapter 600 towards incoming reject water drain tubing 76 for proper alignment therewith. Then tightly secure adapter 600 on Tee 650 by using the S/J washer W and third wing nut 110 provided in the kit (FIGS. 29 and 30).

6. Lastly, fully insert the outlet end 622 of drain tube 76 into the push-in connector of adapter 600 to complete the installation as shown in FIG. 30.

To install the DLA-12 kit components to a single compartment sink without disposal as shown in FIG. 31, simply follow the instructions of steps 1–6 above, with the following exception:

Once the one and one half inch of tubing has been removed from the center of tailpiece 304 (FIGS. 26–27), disconnect and lower the J-bend 46 from trap fitting 54.

Insert the three-way repair Tee 650, then reconnect the trap pieces 46 and 54. Use a bowl B to catch trap water.

It is also to be understood, that as an optional configuration adapter coupling 600 may be installed onto the existing disposal ELL 36 if desired, provided there is enough clearance (such as shown in the system of FIG. 5) to substitute adapter coupling 600 for adapter coupling 126 in the system of FIG. 5, using the materials of the DLA-9 kit. Moreover, adapter coupling 600 also may be substituted for coupling 126 in the double compartment sink installation of FIG. 8, using the materials provided in the kit DLA-12.

Tenth Embodiment Adapter Coupling

Referring to FIGS. 32–35, a modified adapter coupling embodiment 700 is illustrated which is identical to adapter coupling 600 except for the addition of an external flange 702 integrally joined to and extending circumferentially continuously around skirt 602. Flange 702 is preferably spaced above the lower edge 604 of skirt 602 by a distance corresponding to the typical distance between the S/J shoulder 125 and the flat upper end surface of 150 of Tee 102 (FIG. 32). By way of example, this distance may be about 22 millimeters, the axial thickness of flange 702 about 2 millimeters and the distance of flange 702 below shoulder 608 about 6 millimeters. The outside diameter of flange 702 is sized for a slip fit within the S/J nut 110. After coupling 700 is fully assembled with its skirt 602 slip fit in the socket of the upper inlet counterbore 123 of Tee 102, and a standard S/J bevel washer W is employed as the seal for the coupling, flange 702 will be trapped between the under surface of lip 138 of nut 110 and will bear down and compress the S/J bevel washer W onto the Tee bevel 136. Skirt lower edge 604 will then be spaced only slightly above shoulder 125, as shown in FIG. 32. The thickness of flange 702 corresponds generally to one pitch thickness of thread 106 of the Tee flange 104 and hence sufficient threads will remain engaged between flange 104 and nut 110 to provide a secure coupling.

Adapter coupling 700, due to the provision of the external flange 702, is particularly well adapted for use in "commercial" applications wherein the R/O waste water drain connection is being made to heavier wall (e.g., Schedule 40 DWV) standard S/J plumbing fittings, be they made of rough brass, chrome plated brass, ABS, PVC or PP. Commercial applications, as distinguished from typical residential point-of-use undercounter installations, employ such heavier duty fittings which do not have the socket shoulder 125 of the thin walled undercounter S/J plumbing fittings. Typical higher capacity R/O water filtration systems are installed in such commercial applications for office and factory point-of-use and central systems, restaurants and fast food establishments, condominium apartment central systems, as well as in a whole host of other commercial applications.

To fill this need for R/O water drain line coupling in commercial applications, adapter 700 can, as illustrated by the example of FIGS. 33 and 34, be easily installed into the narrow end of a male standard trap adapter fitting 710. One such commercially available trap adapter 710 is the Genova 700 series male adapter Part No. 70415, Schedule 40 PVC-DWV pipe and fittings used in drain-waste-vent applications. The inlet bore 712 of fitting 710 thus is designed to slip fit receive standard one and half inch S/J fittings. The outlet bore 714 is adapted to telescopically receive and be joined by adhesive to standard one and one half or two inch commercial schedule 40 plumbing pipe or fittings. One such fitting is the stand pipe 716 shown in FIG. 34 and coupled via a U-bend fitting 718 and trap elbow 720 to a waste Tee 722 installed in a vertical drain pipe line 724. Fitting 710 is provided with a standard 45° bevel 726 adapted for use with O-ring type seals. Hence adapter coupling 700 preferably includes, in addition to flange 702, an O-ring 728 which is suitably dimensioned so as to be recessed slightly from the outer periphery of flange 702 and to seat on bevel 726. Hence O-ring 728 is sealably captured between flange 702 and bevel 726 when S/J nut 110 is threaded down onto the standard male threads 730 of male adapter 710. Since there is no stop shoulder in the smaller socket of this commercial fitting male adapter 710, such as shoulder 125 of Tee fitting 102, the proper insertion distance for adapter coupling 700 is established by its flange 702. Flange 702 bearing on O-ring 728 also assures proper compression forces axially and, in conjunction with the wedging of bevel 726, radial inward squeezing forces to provide a liquid tight seal in the fully assembled position of adapter coupling 700 on fitting 710 (FIG. 33).

As shown in FIG. 35, adapter 700 can also be readily used to couple R/O waste drain tube 76 to a standard floor drain fitting 732 having a standard one and half inch I.D. socket 734 provided with standard male pipe threads at its upper end, similar to male adapter 710. R/O drain water thus is coupled via adapter coupling 700 to pipe 732 and thence via standard elbows 734, 738 and associated horizontal pipe run 740 to spill into a typical drain box 742. Typically, the bottom of box 742 is perforated at 744 to drain into a floor drain and the spacing of the lower end 746 of elbow 738 above the upper overflow edge 748 of drain box 742 provides the typical air gap required by standard sanitization codes. Again, the proper insertion distance of adapter coupling 700 into the upper end of standpipe 732 is established by the adapter flange 702.

Preferably coupling adapter 700 is conveniently packaged as one component in a "DLA-C" kit which includes the complete adapter coupling 700 along with a one and half inch Schedule 40 ABS or PVC male trap adapter (MIP adapter), or a plastic MNPT nipple. Using these kit parts as a base, the adapter coupling 700 can then be easily connected in any new or existing plumbing drain system, whether smaller or larger than one and half inch. This can be done in ABS, PVC or threaded pipe by using standard plumbing bushings, couplings or bell reducers to decrease or increase the adapter coupling connection to the size of existing drain pipe available.

Eleventh Embodiment Adapter Coupling

FIGS. 36–39 illustrate a presently preferred but exemplary eleventh embodiment 800 of a waste water adapter coupling improvement of the present invention provided with an air gap feature and primarily intended for use in the commercial installations described previously in conjunction with adapter coupling 700. Adapter coupling 800 is similar to adapter coupling 700 but differs therefrom in having an axially elongated upper skirt portion 802, extending between flange 702 and shoulder 608 a distance at least about two inches as an integral extension of lower slip fit skirt 602 and preferably having the same diameter and wall thickness. Upper skirt 802 is provided with at least one large vent opening preferably in the back side of adapter coupling 800 (diametrically opposite the drain tube socket protuberance 614). This upper skirt vent opening, in the example shown in FIGS. 36–39 is generally rectangular as defined by parallel side edges 804 and 806 and top and bottom edges 808 and 810.

Adapter coupling 800 also has an air gap interior drain tube 812 which extends from dome 606 downwardly concentrically with skirt 602–802 in radially inwardly spaced relationship therewith, and terminates at an open bottom end edge 814 aligned flush with or slightly below the lower edge 810 of the skirt opening. Tube 812 is provided with an axially extending side vent opening of generally rectangular shape as defined by parallel side edges 816 and 818 and a concavely curved upper edge 820 (FIGS. 37 and 38). Side edges 816 and 818 terminate at their lower ends at the open lower end edge 814 of tube 812. This vent opening slot 816, 818, 820 of tube 812 is preferably oriented to face diametrically oppositely from the skirt vent opening 804–810, and thus faces toward waste water drain tube 76 as it enters socket protuberance 614 of adapter coupling 800.

Preferably, except for the aforementioned commercially available quick-connect components 132, 133 and 624, all of the aforementioned structural elements of adapter coupling 800 are injection molded or cast in one-piece, again preferably from PP. The wall thickness of tube 812 is generally the same as that of skirt 602, 802, but may have a slight tapering thickness toward the lower end edge 814 to provide a draft angle to facilitate core withdrawal in the molding process. However, air gap tube 812 may, if desired, be made as a separate piece and ultrasonically welded at its upper end to the interior surface of dome 606.

Operation and Advantages of Adapter Coupling Embodiments 600, 700 and 800

Adapter couplings 600 and 700 are particularly advantageous for use in R/O waste water residential undercounter drain installations, regardless of which of the aforementioned kitchen counter sink and disposal and non-disposal systems (as described previously hereinbefore), in which they are employed. Because of the right angle entrance of the R/O waste drain water from tube 76 into the half open passage 620, with its hemispherically shaped end wall 626, and the associated concave interior surface of conical dome 606, the incoming flow of R/O waste drain water as it emerges from outlet end 622 of tube 76 tends to fan out from the lower side opening of passageway 620 in a "sheeting" action. That is, this waterflow tends to cling by capillary action to the 360° concave interior surface of dome 606 and then run down along the interior surface of skirt 602, and likewise into and along the interior wall of tail piece 134 of Tee 102. Hence couplings 600 and 700 also eliminate or greatly reduce the "trickle" noises created by the central column of R/O drain water discharged from elbow 126 employed in the previous embodiments. This noise reduction feature can be an important advantage in household installations wherein the R/O water filtration system may and often does operate when there is no overriding noise from usage of either the sink faucets or sink disposer, and hence when the noise level in the room is low. Under such conditions, the trickle noise of R/O waste water drainage if audible, can be annoying to the occupants.

In addition, couplings 600 and 700 are advantageous from the standpoint of being less likely to be clogged by debris from drainage system back-up or otherwise due to the dome 606 providing a wide tapering outlet from tube end 622 for the incoming R/O drain water, as compared to the smaller diameter outlet of elbow fitting 126. Also, couplings 600 and 700 offer less chances for leakage than coupling 100 because there is one less joint to seal, i.e., they eliminate the joint between the internal pipe threads 144 of central boss 142 and the male pipe threads 128 of the nipple end of elbow 126.

All of the adapter couplings 600, 700 and 800 are completely compatible with standard S/J plumbing fittings provided with standard beveled S/J washers and S/J nuts whether they be made of rough brass, chrome plated brass, ABS, PVC or PTE. In addition, adapter couplings 700 and 800 can be fitted to Schedule 40 commercial plumbing parts, such as male adapter 710, and hence are ideally suited for all types of commercial applications. While it is preferred that adapter 600 have its skirt 602 fully bottomed against the socket shoulder 125 found in thin wall S/J plumbing parts, such as that found in baffle Tee 102, it also is to be understood that skirt lower edge 604 can be spaced slightly above shoulder 125 without thereby impairing its sealing and frictional grip cooperation with the standard beveled S/J washer W and associated wing nut 110 when used in such installations. All of the coupling embodiments 600, 700 and 800 are fully rotatable through 360° during the mounting procedure for ease of alignment with the R/O waste water drain tube 76, without thereby altering or impairing the quality of the sealing engagement of bevel washer W or O-ring 728 and associated nut 110 and, in the case of couplings 700 and 800, flange 702. With the quick connect commercial parts 132, 624 and 133 permanently installed in the tube socket protuberance of these adapter coupling, no subassembly of such adapter parts need be performed by the installer/customer.

In the normal operation of air gap adapter coupling 800, R/O waste drain bypass water enters the adapter coupling passage 620 in a manner similar to embodiments 600 and 700. However, the capillary sheet action of dome 686 is reduced due to the intervention of air gap tube 812, even though such action occurs albeit to a lesser extent due to the flow orientation of passage 620 relative to the axis of tube 76 and the perpendicular relationship of the axis of tube 812 thereto, as well as the curvature of the interior surface passage 620 and the wall of tube 812. Nevertheless, drippage action off the lower end of the tube obviously will occur, and the waste water stream into adapter 710 and the plumbing there below can, result in a higher noise level of operation than with adapter couplings 600 and 700.

Moreover, the air gap vent opening 804–810 in skirt 802 will allow noise to escape from the adapter coupling, but this is a common and accepted characteristic of air gap fixtures. Thus in the commercial applications intended for use of adapter coupling 800, any such operational noise is not a disadvantage because of the typical noisy environment in which such fixtures are used.

Adapter coupling 800 enables a quick, easy and inexpensive combination R/O waste drain and air gap connection to be made to drain plumbing where, unlike household undercounter installations, an existing air gap fixture may not be available upstream of the coupling. Hence plumbing code air gap requirements can be economically satisfied by use of coupling 800 in these installation situations. For example, commercially available water softening appliances, whether used alone or in conjunction with R/O water filter systems, have a waste water bypass system operable during the back flushing cycle and hence have back-flush drain tubing which needs to be coupled to drain sewer systems or the like. Adapter coupling 800 is ideally suited for these non-R/O applications as well as for R/O applications.

Under abnormal operational conditions, as when water or sewage back up occurs downstream of the installed adapter coupling 800, such back up water can rise in coupling 800 only until it reaches the overflow spill level or flood level of overflow opening 804–810. Hence such back up liquid cannot rise further to contaminate the incoming waste water drain flow emerging from the outlet of tube 76 or, when there is little or no such flow to possibly back up into tube 76, i.e., the standard function and operation of an air gap in the drain line system. For this reason, industry standards specify that the vertical elevation from the lowermost flood level at edge 810 to the fitting drain inlet 620 be at least two inches. Coupling 800 is thus designed to meet or exceed this requirement.

Moreover, the open slot 816–820 in air gap tube 812 prevents back up liquid from rising in tube 812, which otherwise might occur under back up surge conditions. Likewise the vertically co-extensive air gap slots 804–810 and 816–820 provide ample vertical separation and ambient exposure to the drain flow path to fully prevent any backsiphon suction pressure from drawing downstream contaminated water back up into the drain tube 76, i.e., the normal anti-siphon action of an air gap. In addition, the side wall of air gap 812 being closed for approximately 300°, with its slot 816–820 facing oppositely from the outer air gap slot 804–810, provides an anti-splash effect which prevents the R/O or other appliance bypass drain water (or other liquid) surges entering the top of the tube 812 from spraying or splashing out of the outer skirt air gap vent opening 804–810. This reversed orientation of the respective air vent slots also contributes to muffling the noise emanating from coupling 800 generated by incoming drain water from tube 76. However, it is also to be understood that the orientation of vent slots 804–810 and 816–820 can be rotated 90° relative to the axis of tube 76, so as to be parallel to the plane of the drawing of FIGS. 38 and 39 if desired to facilitate molding when the mold parting line lies in such plane.

Because adapter coupling 800 at its lower end is constructed with slip fit skirt 602 and stop flange 702 of adapter coupling 700, it likewise can be used with standard slip joint undercounter household plumbing fittings, although its primary intended application, as indicated previously, is in commercial applications. It is also to be understood that all of the adapter coupling embodiments of the invention can be either adapted to or converted for different sizes of drain tubes 76 other than the ⅜ inch OD tubing shown by way of example herein. This can be accomplished by using a John Guest barbed male-to-male adapter fitting having an upstream barbed male end sized to receive for example ½ inch I.D. or O.D. tubing and a downstream smooth male end made ⅜ inch in diameter for insertion through the quick connect component 132, 133 and 624 built into the right angle socket protuberance of the adapter couplings. Alternatively, the dimensions of the protuberance 614 or elbow 126 can be enlarged and the appropriate size commercially available quick connect components installed therein. For higher volume applications, the latter approach is preferred because of the elimination of potential leak joints involved with use of the aforementioned barbed male adapter fitting.

Additional combinations utilizing further variations in the couplings and system hook-ups illustrated and described hereinabove will also become apparent from the foregoing disclosure by those skilled in the art to meet the wide variety of undercounter installation problems encountered in the field due to additional water consuming appliances also being installed undercounter in the vicinity of the sink.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. The present invention, therefore is intended to be limited only by the scope of the appended claims and the applicable prior art.

I claim:

1. A waste liquid drain line coupling adapter constructed for use between a waste liquid drain line outlet tube of a liquid processing appliance and a drain trap plumbed to a drainage system by standard slip-joint (S/J) plumbing fittings, including a standard S/J conduit fitting with a normally open inlet, a normally open outlet downstream of the inlet thereof for drain communication with said trap, the conduit inlet having external threads and an internal seat with an S/J nut and an associated annular S/J seal respectively removably mounted thereon and adapted for slip joint receiving the slip end of a standard S/J plumbing fitting;

said adapter comprising removable end closure means for closing the conduit inlet, said adapter being constructed and arranged to have a circular peripheral wall portion adapted when in assembly with the conduit inlet with said circular peripheral wall portion and the seal juxtaposed with an internal annular flange of the S/J nut and the conduit inlet internal seat such that threadably tightening of the S/J nut on the conduit inlet external threads sealably squeezes and clamps together said adapter peripheral wall portion and the annular seal by compression between the nut internal flange and the conduit inlet internal seat, said adapter also having an elbow portion with an outlet in said wall portion and an inlet provided with connector means adapted for sealably slip receiving and retaining an outlet end of the waste liquid drain line tube, said wall and elbow portions of said adapter together forming a removable closure for said conduit inlet having a through-passageway adapted for draining waste liquid from the outlet end of the drain tube into the interior of the conduit fitting via said conduit inlet.

2. The coupling adapter as set forth in claim 1 wherein said wall portion of said adapter comprises a hollow tubular skirt open at a first axial end thereof to form said outlet in said wall portion of said adapter, an interiorly concave dome having a wide end connected to a second axial end of said skirt axially opposite said skirt first end, said dome converging to an apex area spaced axially remote from said skirt second end, said elbow portion inlet comprising a tubular socket protuberance projecting exteriorly from the exterior apex area of said dome and having a through-passageway oriented with its axis transverse to the longitudinal axis of said skirt, said connector means being disposed in said protuberance passageway and having inlet socket means for sealably receiving an outlet end of said waste water drain line, said through-passageway having an outlet opening generally to the interior apex area of said dome whereby said protuberance and said dome form said elbow, said skirt having at least a cylindrical slip fit portion adjacent said skirt first end diametrically sized for a slip fit into the conduit fitting inlet to thereby form, with said dome, said end closure means of said adapter, said slip fit portion of said skirt being adapted to slidably receive thereon the annular seal so as to encircle said skirt slip fit portion for compression sealing and frictionally gripping against the exterior surface thereof by tightening of the S/J nut of the conduit inlet external threads.

3. The coupling adapter set forth in claim 2 wherein said elbow protuberance inlet socket means comprises a push-in catch and release collet, an associated cap collar and associated O-ring adapted to be push-in sealably coupled to the outlet end of the waste water drain line tube.

4. The coupling adapter set forth in claim 3 wherein said dome is conically shaped and said skirt is entirely cylindrically shaped.

5. The coupling adapter set forth in claim 4 wherein said dome has a cone angle of about 45° and the longitudinal axes of said skirt and protuberance portion passageway are generally perpendicular to one another.

6. The coupling adapter set forth in claim 5 wherein said dome and skirt are completely imperforate.

7. The coupling adapter set forth in claim 6 wherein said protuberance, said dome and said skirt are molded or cast in one-piece.

8. The coupling adapter set forth in claim 3 wherein said skirt has a radially protruding circumferentially continuous external flange adapted to be axially interposed between the conduit inlet internal seat and an internal clamping flange lip of the S/J nut.

9. The coupling adapter set forth in claim 8 adapted for use with an O-ring serving as the S/J seal.

10. The coupling adapter set forth in claim 2 wherein said skirt has an axially extending elongate air vent open communicating the skirt interior with ambient, and said adapter further includes an interior air gap liquid baffle channel means constructed and arranged within said skirt and extending from said outlet of said protuberance passageway axially of said skirt for a distance generally at least coextensive with said skirt air vent opening, said interior air gap baffle channel means terminating at an open end remote from said dome and also having an axially elongate air vent opening generally coextensive with said skirt air vent opening and oriented out of angular registry therewith.

11. The coupling adapter as set forth in claim 10 wherein said skirt and baffle channel means are generally tubular and said air vent openings constitute the only air vent openings of said adapter, each of said air vent openings having a circumferential extent less than 180° and being oriented diametrically opposite one another and facing away from each other, and wherein said dome, skirt and interior baffle means are imperforate except for said air vent openings and said adapter through-passageway inlet and outlet.

12. A method of installing a waste liquid drain line coupling adapter constructed for use between a waste liquid drain line outlet tube of a liquid processing appliance and a drain trap plumbed to a drainage system by standard slip-joint (S/J) plumbing fittings, including a standard S/J conduit fitting with a normally open inlet, a normally open outlet downstream of the inlet thereof for drain communication with said trap, the conduit inlet having external threads and an internal seat with an S/J nut and an associated annular S/J seal respectively removably mounted thereon and adapted for slip joint receiving the slip end of a standard S/J plumbing fitting;

said adapter comprising removable end closure means for closing the conduit inlet, said adapter being constructed and arranged to have a circular peripheral wall portion adapted when in assembly with the conduit inlet with said circular peripheral wall portion and the seal juxtaposed with an internal annular flange of the S/J nut and the conduit inlet internal seat such that threadably tightening of the S/J nut on the conduit inlet external threads sealably squeezes and clamps together said adapter peripheral wall portion and the annular seal by compression between the nut internal flange and the conduit inlet internal seat, said adapter also having an elbow portion with an outlet in said wall portion and an inlet provided with connector means adapted for sealably slip receiving and retaining an outlet end of the waste liquid drain line tube, said wall and elbow portions of said adapter together forming a removable closure for said conduit inlet having a through-passageway adapted for draining waste liquid from the outlet end of the drain tube into the interior of the conduit fitting via said conduit inlet, said method comprising the steps of:

(1) provide a standard 3-way S/J Tee fitting to serve as the aforesaid standard S/J conduit fitting whereby one of the two Tee inlets provide the first aforesaid inlet and the second Tee inlet and the Tee outlet are available for serial flow connection into the existing plumbing fittings, (2) cut out a section of the existing plumbing and make into a slip fit tailpiece or provide same as a replacement piece, (3) fit the downstream end of the tailpiece into the Tee second inlet and secure with a S/J nut and washer for coupling the tee with the upstream end of the tailpiece in the plumbing line, (4) couple the Tee outlet into the downstream section of the cut-out plumbing with an S/J nut and washer, and (5) attach the adapter coupling to the Tee first inlet with an S/J nut and washer.

* * * * *

UNITED STATES PATENT AND TRADEMARK OFFICE
CERTIFICATE OF CORRECTION

PATENT NO. : 5,681,459
DATED : October 28, 1997
INVENTOR(S) : Dennis E. Bowman

It is certified that error appears in the above-indentified patent and that said Letters Patent is hereby corrected as shown below:

Title page of patent, in the title, change "REFECT" to "REJECT".

Col 1, Line 1, change "REFECT" to "REJECT".

Signed and Sealed this

Third Day of February, 1998

Attest:

BRUCE LEHMAN

*Attesting Officer*    *Commissioner of Patents and Trademarks*